US009826026B2

(12) United States Patent
Shin et al.

(10) Patent No.: US 9,826,026 B2
(45) Date of Patent: Nov. 21, 2017

(54) CONTENT TRANSMISSION METHOD AND SYSTEM, DEVICE AND COMPUTER-READABLE RECORDING MEDIUM THAT USES THE SAME

(71) Applicant: Samsung Electronics Co., Ltd., Suwon-si (KR)

(72) Inventors: In-young Shin, Seoul (KR); Won-jong Choi, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 621 days.

(21) Appl. No.: 13/948,311

(22) Filed: Jul. 23, 2013

(65) Prior Publication Data
US 2014/0032710 A1    Jan. 30, 2014

(30) Foreign Application Priority Data
Jul. 27, 2012    (KR) .................. 10-2012-0082785

(51) Int. Cl.
*H04L 29/08*    (2006.01)
*H04W 4/02*    (2009.01)

(52) U.S. Cl.
CPC .......... *H04L 67/10* (2013.01); *H04L 67/1004* (2013.01); *H04L 67/1021* (2013.01); *H04L 67/1095* (2013.01); *H04L 67/18* (2013.01); *H04W 4/028* (2013.01)

(58) Field of Classification Search
None
See application file for complete search history.

(56) References Cited

U.S. PATENT DOCUMENTS 8,533,296 B2 *  9/2013  McGowan .............. H04L 67/06
                                            707/708
8,687,104 B2 *  4/2014  Penov .................. G06K 9/6202
                                            348/222.1
(Continued)

FOREIGN PATENT DOCUMENTS

CN         1695142 A    11/2005
CN       101043519 A     9/2007
(Continued)

OTHER PUBLICATIONS

Andrew Thompson, "File Browser GUI", Stackexchange.com, May 31, 2011, 25 pages total, XP-002711700, retrieved from the internet: URL:http://codereview.stackexchange.com/questions/4446/file-browser-gui/4451 (retrieved Aug. 22, 2013).
(Continued)

*Primary Examiner* — Ranodhi Serrao
(74) *Attorney, Agent, or Firm* — Sughrue Mion, PLLC

(57) ABSTRACT

One or more exemplary embodiments provide a content transmission method and system, a device and a computer-readable recording medium thereof, configured to map user cloud account information with content. The content transmission method includes determining attribute information regarding content or uploading of the content; mapping user cloud account information, which corresponds to the determined attribute information, with the content; and transmitting the content to a cloud which is determined based on the mapped user cloud account information.

18 Claims, 22 Drawing Sheets

(56) References Cited

U.S. PATENT DOCUMENTS

| | | | |
|---|---|---|---|
| 8,903,819 B2 * | 12/2014 | Nichols | G06F 17/30035 707/734 |
| 8,922,662 B1 * | 12/2014 | Fu | H04N 5/23264 348/208.12 |
| 9,081,798 B1 * | 7/2015 | Wong | G06F 17/30247 |
| 9,100,245 B1 * | 8/2015 | Andrews | H04L 29/06836 |
| 9,176,779 B2 | 11/2015 | Gerovac et al. | |
| 9,223,902 B1 * | 12/2015 | McHugh | G06F 17/30967 |
| 9,237,188 B1 * | 1/2016 | Gabrielson | H04L 67/10 |
| 2005/0216855 A1 | 9/2005 | Kopra et al. | |
| 2008/0126518 A1 | 5/2008 | Kim et al. | |
| 2008/0307311 A1 | 12/2008 | Eyal | |
| 2010/0217834 A1 * | 8/2010 | Woodcock | H04L 12/00 709/218 |
| 2011/0022642 A1 | 1/2011 | deMilo et al. | |
| 2011/0106917 A1 | 5/2011 | Park et al. | |
| 2011/0197065 A1 * | 8/2011 | Stauth | H04L 63/08 713/170 |
| 2011/0264768 A1 | 10/2011 | Walker et al. | |
| 2012/0047156 A1 | 2/2012 | Jarvinen et al. | |
| 2012/0054155 A1 | 3/2012 | Darcy | |
| 2012/0117271 A1 * | 5/2012 | Kennedy | G06F 17/30575 709/248 |
| 2013/0258117 A1 * | 10/2013 | Penov | G06K 9/6202 348/207.1 |
| 2014/0211067 A1 * | 7/2014 | Penov | G06K 9/6202 348/333.03 |

FOREIGN PATENT DOCUMENTS

| | | |
|---|---|---|
| CN | 102204267 A | 9/2011 |
| CN | 102855294 A | 1/2013 |
| RU | 2426252 C2 | 8/2011 |
| WO | 2012092179 A2 | 7/2012 |

OTHER PUBLICATIONS

Tacit Dynamics, "Tacit Dynamics—Help", Mar. 8, 2012, 3 pages total, XP-002711699, retrieved from the internet: URL:http://web.archive.org/web/20120308155447/http://www.tacit.dk/foldersync/help (retrieved Aug. 21, 2013).

Communication dated Sep. 4, 2013, issued by the European Patent Office in counterpart European Application No. 13178136.1.

Communication dated Nov. 25, 2013 issued in International Application No. PCT/KR2013/006483 (PCT/ISA/210/220/237).

Communication issued by the European Patent Office, May 4, 2015, in related Application No. 13178136.1.

Communication dated Mar. 1, 2017 issued by The State Intellectual Property Office of P.R. China in counterpart Chinese Application No. 201380039626.7.

Communication dated Jul. 19, 2017, issued by the Russian Patent Office in counterpart Russian Application No. 2015106711.

* cited by examiner

FIG. 2

| CONTENT ATTRIBUTE ITEM / CONTENT NAME | SYNCHRONIZATION HISTORY INFORMATION | CONTENT TYPE | CREATION OR PLAY TIME | DEVICE LOCATION DURING CREATION OR PLAY | NETWORK LOCATION DURING CREATION OR PLAY | APPLICATION ATTRIBUTE | ACTIVATED CLOUD ACCOUNT INFORMATION | CONNECTED EXTERNAL DEVICE |
|---|---|---|---|---|---|---|---|---|
| CONTENT 1 | 1ST CLOUND ACCOUNT | DOCUMENT | 5:00 P.M MONDAY | A | COMPANY NETWORK | DOCUMENT PREPARATION | X | X |
| CONTENT 2 | X | MUSIC | 8:00 P.M WEDNESDAY | B | PUBLIC NETWORK | MUSIC PLAYBACK | X | X |
| CONTENT 3 | X | MOVING PICTURE | 11:00 P.M THURSDAY | C | HOME NETWORK | MOVIE PLAYBACK | 2ND CLOUD ACCOUNT | X |
| CONTENT 4 | X | PICTURE | 8:00 A.M SUNDAY | D | PUBLIC NETWORK | CAMERA | X | X |
| CONTENT 5 | X | X | X | X | X | X | 3RD CLOUD ACCOUNT | X |

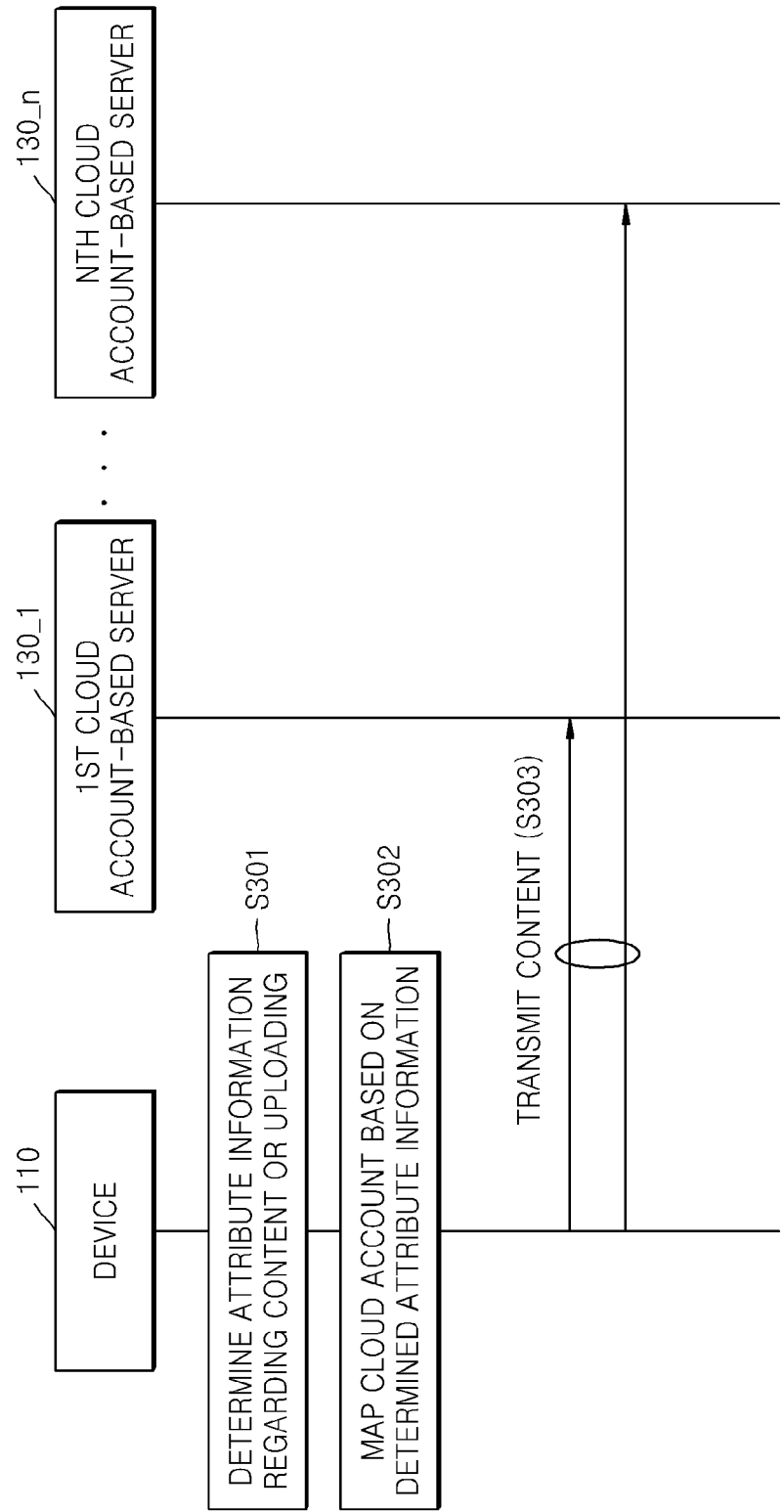

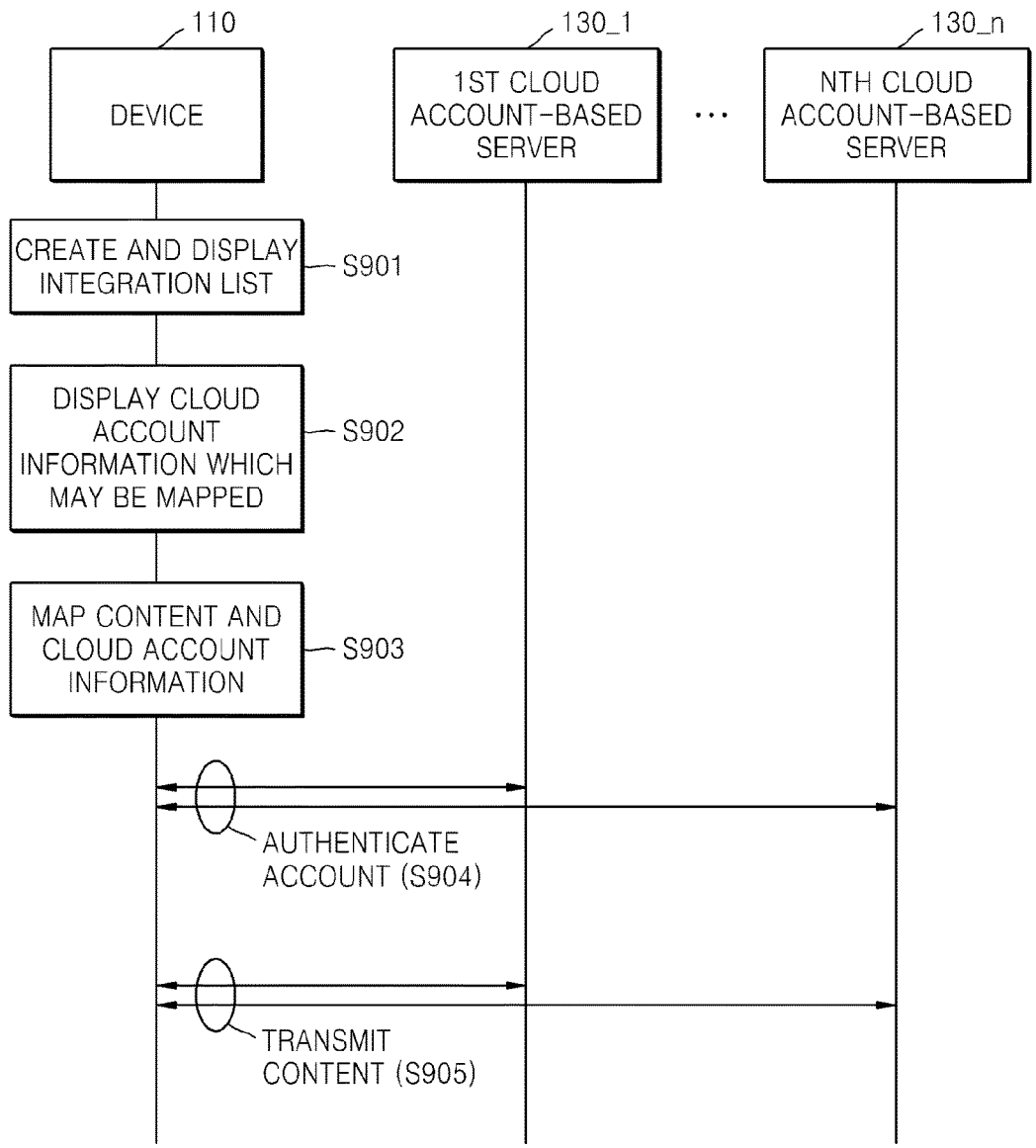

CONTENT TRANSMISSION METHOD AND SYSTEM, DEVICE AND COMPUTER-READABLE RECORDING MEDIUM THAT USES THE SAME

CROSS-REFERENCE TO RELATED PATENT APPLICATION

This application claims the benefit of Korean Patent Application No. 10-2012-0082785, filed on Jul. 27, 2012, in the Korean Intellectual Attribute Office, the disclosure of which is incorporated herein in its entirety by reference.

BACKGROUND

1. Field

One or more exemplary embodiments of the present disclosure relate to content transmission, and more particularly, to a method, a system, and a device for content transmission between devices or between a device and a server, the device, and a computer-readable recording medium that uses the same.

2. Description of the Related Art

Recently, an Internet-based cloud server has been developed which may provide a user with a cloud service for managing information technology (IT) hardware resources such as a server, a desktop computer, or a storage, for managing a platform in which software may be developed, and for managing software, and for using information that is stored in the cloud server at any time and place by using various IT devices. Examples of cloud services include sCloud, uCloud, nDrive, Daum Cloud, SkyDrive, Dropbox, T-Cloud, iCloud, and so on.

As various cloud services are proposed, the number of users who have cloud account information, which is hereinafter also referred to as a cloud account, increases. Additionally, as the amount of content of users increases, efficient content transmission between a cloud server and a device is in demand.

Furthermore, as types of IT devices become more and more diverse, and as the amount of user content continues to rapidly increase, efficient content transmission between devices is required.

SUMMARY

One or more exemplary embodiments provide a method and system for content transmission between a device and an external device based on attribute information about content and attribute information about user cloud account information, the device, and a computer-readable recording medium that uses the same.

One or more exemplary embodiments also provide a method and system for content transmission between devices based on attribute information about content and attribute information about the devices, the device, and a computer-readable recording medium that uses the same.

One or more exemplary embodiments also provide a method and system for content synchronization between a device and an external device based on attribute information about content and attribute information about user cloud account information, the device, and a computer-readable recording medium that uses the same.

One or more exemplary embodiments also provide a method and system for content synchronization between devices based on attribute information about content and attribute information about the device, the device, and a computer-readable recording medium that uses the same According to an aspect of the exemplary embodiments, there is provided a content transmission method to be performed by a device, the method including: determining attribute information regarding content or uploading of the content; mapping at least one piece of user cloud account information, which corresponds to the determined attribute information, with the content; determining an external device based on the mapped at least one piece of user cloud account information; and transmitting the content to the external device.

The determining of the attribute information may include determining the attribute information, based on at least one of synchronization history information about the content based on at least one piece of user cloud account information, type information about a type of the content, time information about creation or playback of the content, information about a location of the device during creation or playback of the content, information about a network location during content creation or playback of the content, user cloud account information activated during creation or playback of the content, and attribute information about an application by which the content is created or played.

The determining of the attribute information may be performed when the content is created or played, or by using at least one of metadata of the content and log information about the device.

The mapping of the at least one piece of user cloud account information with the content may be performed based on attribute information about the at least one piece of user cloud account information.

The attribute information about the user cloud account information may be set by a user of the device, set according to a keyword which is input by the user of the device, or included in registration information which is input by the user of the device.

The method may be executed according to one of a request for content transmission by a user, a request for execution of a content transmission application by the user, a content transmission period which is set by the user, a content transmission time which is set by the user, and an idle state of the device.

The method may further include displaying a list related to the at least one content which is mapped with the at least one piece of user cloud account information based on attribute information about the at least one piece of user cloud account information, wherein the transmitting of the content to the external device is performed by controlling a transmission request item, which is displayed with the list related to the content.

The method may further include editing the list related to the content according to user input information.

The method may further include displaying a content list which includes at least one check box according to attribute information of at least one piece of user cloud account information configured to be mapped with the content, wherein the content list displays attribute information about the at least one piece of user cloud account information that is mapped with the content in the mapping.

The method may further include, according to user input information which is input using the at least one check box, changing the attribute information about the at least one piece of user cloud account information that is mapped with the content into the attribute information of the at least one piece of user cloud account information that is configured to be mapped with the content.

The method may further include displaying an integration list which includes first attribute information about the at least one piece of user cloud account information that is mapped with the content; displaying a drop list which includes second attribute information about at least one other piece of user cloud account information according to user input information regarding the first attribute information included in the integration list; and changing the at least one piece of user cloud account information that is mapped with the content into the at least one other piece of user cloud account information according to user input information regarding the second attribute information which is included in the drop list.

The Integration list may include information which represents an application by which the content is created or played.

The transmitting of the content may include storing metadata related to the content in the device and deleting the content from the device after the transmitting.

The transmitting of the content may include storing metadata related to the content in the device and not storing the content in the device. The transmitting of the content may include authenticating the at least one piece of user cloud account information mapped with the content. The transmitting of the content may be performed to synchronize content, stored in the device, with content, stored in the external device.

The external device may be implemented as a cloud service based server.

The external device may include at least one from among at least one cloud service based server and at least one external device which are able to be connected to the external device.

According to another aspect of the exemplary embodiments, there is provided a device including a communication unit configured to communicate with an external device which is determined based on user cloud account information; a storage configured to store an application, a content transmission program based on the at least one piece of user cloud account information, and information regarding content transmission; an input information receiver configured to receive user input information; an output device configured to output user interface information, according to the user input information, and to further output information according to execution of the content transmission program; and a processor configured to, in order to upload content, determine attribute information regarding the content or uploading of the content, map the at least one piece of user cloud account information, which corresponds to the determined attribute information, with the content, determine an external device based on the mapped at least one piece of user cloud account information, and transmit the content to the external device, via the communication unit.

According to another aspect of the exemplary embodiments, there is provided a device including: a touch screen configured to receive touch-based user input information, and display information to transmit content to an external device which is determined based on at least one piece of user cloud account information; a processor configured to provide a user interface (UI) by controlling the touch screen; a communication unit configured to communicate with at least one external device based on the at least one piece of user cloud account information; and a storage configured to store a program, which is configured to be executed by the processor, and information regarding transmission of the content, wherein the program includes a command configured to determine attribute information regarding the content or the content uploading, map the at least one piece of user cloud account information, which corresponds to the determined attribute information, with the content, determine the external device based on the mapped at least one piece of user cloud account information, and transmit the content to the external device.

According to another aspect of the exemplary embodiments, there is provided a content transmission system, including: a plurality of external devices configured to store content; and a device configured to, in order to upload the content, determine attribute information regarding the content or uploading of the content, map at least one piece of user cloud account information, which corresponds to the determined attribute information, with the content, determine an external device from the plurality of external devices based on the mapped user cloud account information, and transmit the content to the determined external device.

According to another aspect of the exemplary embodiments, there is provided a content transmission method to be performed by a device, the method including: displaying an integration list related to content which is created or played by an application on the device; displaying at least one piece of user cloud account information which is configured to be mapped with the content, included in the integration list, on the device; mapping the at least one piece of user cloud account information with the content; determining an external device based on the mapped at least one piece of user cloud account information; and transmitting the content to the determined external device.

According to another aspect of the exemplary embodiments, there is provided a device including: a communication unit configured to communicate with at least one external device which is configured to be connected to the device by using at least one piece of user cloud account information; a storage configured to store at least one application, a content transmission program based on the at least one piece of user cloud account information, and information regarding content transmission; an input information receiver configured to receive user input information; an output device configured to output user interface information, according to the user input information, and to further output information according to execution of the content transmission program; and a processor configured to display an integration list related to content which is created or played by at least one application via the output device, display at least one piece of user cloud account information which is configured to be mapped with the content included in the integration list via the output unit, map at least one piece of user cloud account information with the content based on the displayed at least one piece of user cloud account information, and transmit the content to an external device which is determined based on the mapped at least one piece of user cloud account information, wherein the at least one external device includes the determined external device.

According to another aspect of the exemplary embodiments, there is provided a device including: a touch screen configured to receive touch-based user input information, and display information to transmit content to an external device which is determined based on at least one piece of user cloud account information; at least one processor configured to provide a user interface (UI) by controlling the touch screen; a communication unit configured to communicate with an external device; and a storage configured to store a program, which is configured to be executed by the processor, and information regarding transmission of the content, wherein the program further includes commands configured to display an integration list related to the content, which are created or played by an application on the device, display at least one piece of user cloud account information which is configured to be mapped with the content included in the integration list on the device, map the at least one piece of user cloud account information with the content, determine the external device based on the mapped at least one piece of user cloud account information, and transmit the content to the determined external device, wherein the external device includes the determined external device.

According to another aspect of the exemplary embodiments, there is provided a content transmission system, including: an external device which is determined based on at least one piece of user cloud account information; and a device configured to display an integration list related to content, which is created or played by an application, on the device, display at least one piece of user cloud account information which is configured to be mapped with the content included in the integration list, on the device, map the at least one piece of user cloud account information with the content, and transmit the content to external device which is determined based on the mapped at least one piece of user cloud account information.

According to another aspect of the exemplary embodiments, there is provided a content transmission method to be performed by device, the method including: determining attribute information regarding content or uploading of the content; mapping at least one external device, which corresponds to the determined attribute information, with the content; and transmitting the content to the mapped external device.

The mapping of the external device with the content may be performed based on attribute information related to the external device.

According to another aspect of the exemplary embodiments, there is provided a synchronization method, including: creating an integration list regarding content which is created or played by at least one application; mapping at least one piece of user cloud account information for each unit of content included in the integration list; determining an external device based on the mapped at least one piece of user cloud account information, and synchronizing content, stored in the external device, with content included in the integration list.

The mapping of the at least one piece of user cloud account information for the each content may be performed based on at least one from among content synchronization history information which is based on the at least one piece of user cloud account information, type information about the content, time information about creation or playback of the content, information about a location of a device during creation or playback of the content, information about a network location during creation or playback of the content, user cloud account information which is set for the device by default, user cloud account information which is activated during creation or playback of the content, attribute information about an application which created or played content, and attribute information about the cloud account.

The creating of the integration list may be performed based on at least one from among folder units, file units, and content types.

The integration list may include identification information about each unit of content and identification information about the application.

The content synchronization method may be executed according to one from among a selection of a content synchronization menu item by a user, a request by the user for execution of a content transmission application, a content transmission period which is set by the user of the device, a content transmission time which is set by a user, and an idle state of the device.

The content synchronization method may further include storing information obtained by mapping at least one piece of user cloud account information with each unit of content in at least one cloud service based external device based on at least one piece of user cloud account information.

The synchronizing of the content may include authenticating the mapped at least one piece of user cloud account information, and then, synchronizing the content.

The synchronizing of the content may be performed by using at least one from among information about the content capacity, information about a content creation or play time, a hash value of the content, and a name of the content.

The synchronizing of the content may include one of determining an order of the synchronizing based on the integration list and determining an order of the synchronizing based on the user cloud account information.

The external device may be based on at least one of at least one cloud service based server connected to the device and at least one external device.

According to another aspect of the exemplary embodiments, there is provided a device including: a communication unit configured to communicate with at least one external device which is determined based on at least one piece of user cloud account information; a storage configured to store at least one application, a content synchronization program based on the at least one piece of user cloud account information, and information regarding content synchronization; an input information receiver configured to receiver user input information; an output device configured to output user interface information, according to the user input information, and information according to execution of the content synchronization program; and a processor configured to create an integration list related to content which is created or played by the at least one application, map at least one piece of user cloud account information with content that is included in the integration list, and synchronize content, stored in an external device which is determined based on the mapped at least one piece of user cloud account information, with content included in the integration list, via the communication unit.

According to another aspect of the exemplary embodiments, there is provided a device including: a touch screen configured to receive touch-based user input information, and display information to synchronize content, which is created or played by the at least one application, with content stored in an external device which corresponds to at least one piece of user cloud account information; a processor configured to provide a UI by controlling the touch screen; a communication unit configured to communicate with the external device; and a storage configured to store at least one program, which is configured to be executed by the processor, and information regarding synchronization of the content, wherein the program includes commands configured to display an integration list related to at content, which is created or played by at least one application, on the device, display at least one piece of user cloud account information which may be mapped with each content, included in the integration list, on the device, map the at least one piece of user cloud account information with the content, based on the displayed at least one piece of user cloud account information, and synchronize the content, included in the integration list, with the content, stored in an external device which is determined based on the mapped at least one piece of user cloud account information.

According to another aspect of the exemplary embodiments, there is provided a content synchronization system including: an external device which corresponds to at least one piece of user cloud account information; and a device configured to display an integration list of contents, which are created or played by at least one application, on the device, display at least one piece of user cloud account information which may be mapped with each content, included in the integration list, on the device, map at least one piece of user cloud account information with the content, based on the displayed at least one piece of user cloud account information, and synchronize the content, included in the integration list, with the content, stored in an external device which is determined based on the mapped at least one piece of user cloud account information.

According to another aspect of the exemplary embodiments, there is provided a content synchronization method including: displaying an integration list in which at least one content, which is created or played by at least one application, is arranged according to at least one piece of user cloud account information, on the device; and synchronizing the content with content stored in an external device which is determined based on the mapped at least one piece of user cloud account information according to the at least one piece of user cloud account information.

According to another aspect of the exemplary embodiments, there is provided a device including: a communication unit configured to communicate with at least one external device which corresponds to at least one piece of user cloud account information; a storage configured to store at least one application, a content synchronization program which is based on the at least one piece of user cloud account information, and information regarding content synchronization; an input information receiver configured to receive user input information; an output device configured to output user interface information, according to the user input information, and information according to execution of the content synchronization program; and a processor configured to display an integration list in which at least one content, which is created or played by the at least one application, is arranged according to the at least one piece of user cloud account information, via the output unit; and synchronize the content with content stored in an external device which is determined based on the mapped at least one piece of user cloud account information according to the at least one piece of user cloud account information via the communication unit.

According to another aspect of the exemplary embodiments, there is provided a device including: a touch screen configured to receive touch-based user input information, and display information for synchronizing content, which are created or played by the at least one application, with content stored in an external device which is determined based on at least one piece of user cloud account information; a processor configured to provide a UI by controlling the touch screen; a communication device configured to communicate with at least one external device which corresponds to at least one piece of user cloud account information; and a storage configured to store at least one program, which is configured to be executed by the processor, and information regarding synchronization of the content, wherein the program includes commands configured to display an integration list in which at least one content, which is created or played by the at least one application, is arranged according to the at least one piece of user cloud account information; and synchronize the content with content stored in an external device which is determined based on the at least one piece of user cloud account information according to the at least one piece of user cloud account information.

According to another aspect of the exemplary embodiments, there is provided a content synchronization system including: at least one external device which corresponds to at least one piece of user cloud account information; and a device configured to display an integration list in which at least one content, which is created or played by the at least one application, is arranged according to the at least one piece of user cloud account information, and synchronize the content included in the integration list with the content, stored in an external device which is determined based on the at least one piece of user cloud account information.

According to another aspect of the exemplary embodiments, there is provided a non-transitory computer-readable recording medium having stored thereon commands, which when executed by a computer, cause a device to perform the content transmission method, as described with the content transmission method.

According to another aspect of the exemplary embodiments, there is provided a non-transitory computer-readable recording medium having stored thereon commands, which when executed by a computer, cause a device to perform the content synchronization method, as described with the content synchronization method.

BRIEF DESCRIPTION OF THE DRAWINGS

The above and other features and advantages of the present disclosure will become more apparent by describing in detail exemplary embodiments thereof with reference to the attached drawings in which:

FIG. 2 is an example diagram illustrating a determination of attribute information regarding content or uploading which is executed according to an exemplary embodiment;

FIG. 3 is an operation flowchart illustrating a content transmission method according to an exemplary embodiment, and is based on the content transmission system of FIG. 1;

FIG. 9 is an operation flowchart illustrating a content transmission method according to another exemplary embodiment, and is based on the content transmission system of FIG. 1;

DETAILED DESCRIPTION OF THE EXEMPLARY EMBODIMENTS

Figure 1:
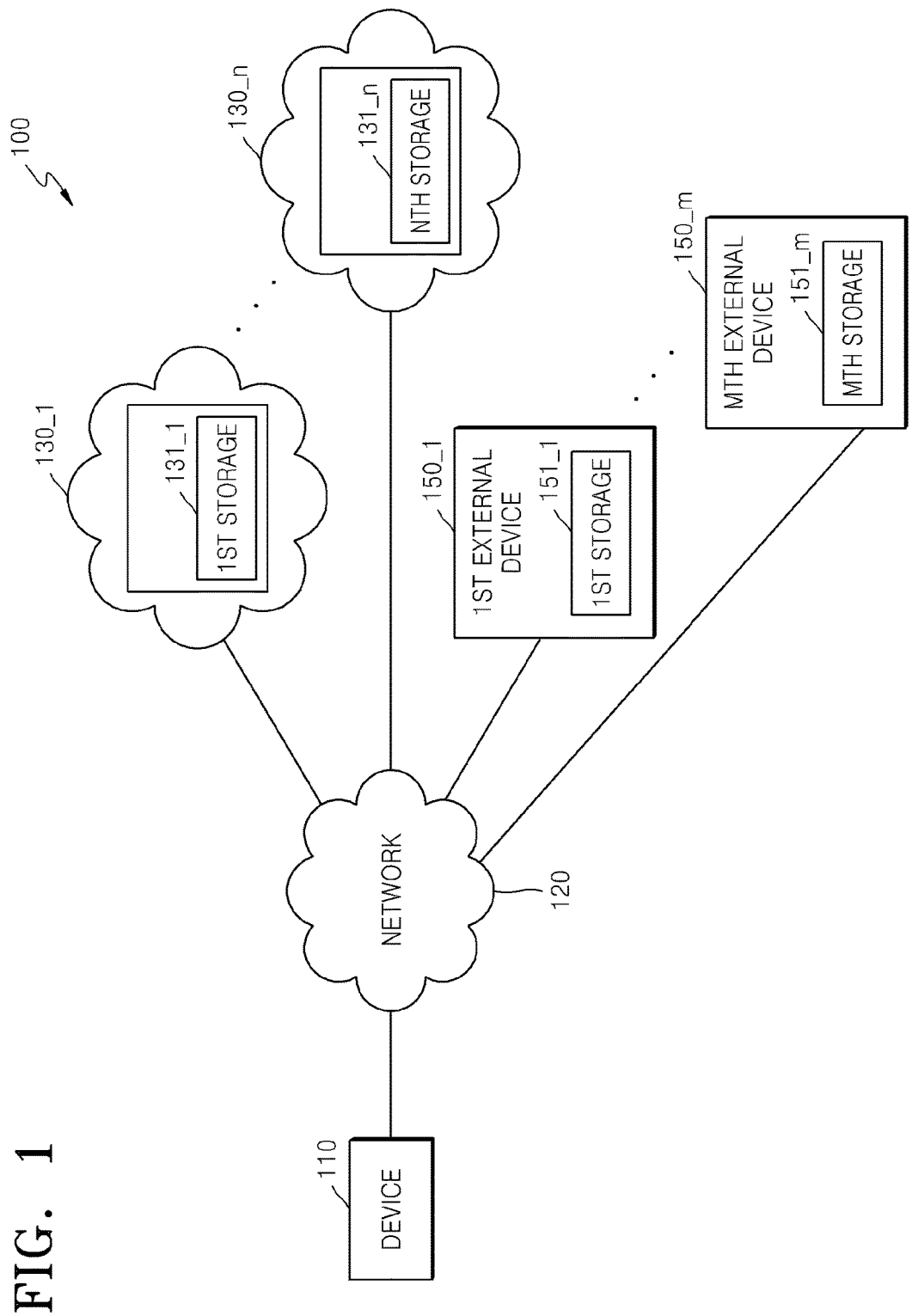
FIG. 1 is a configuration map of a content transmission system, according to an exemplary embodiment.

As the exemplary embodiments allow for various changes and numerous embodiments, particular exemplary embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of related art are omitted when it is deemed that such detailed explanations may unnecessarily obscure the essence of the exemplary embodiments.

While such terms as "first", "second", etc., may be used to describe various components, such components must not be limited to the above terms. The above terms are used only to distinguish one component from another.

The terms used in the present specification are merely used to describe particular exemplary embodiments, and are not intended to limit the present disclosure. General and widely-used terms have been employed herein, in consideration of functions provided in the present disclosure, and may vary according to an intention of one of ordinary skill in the art, a precedent, or emergence of new technologies. Additionally, in some cases, an applicant may arbitrarily select specific terms. Then, the applicant will provide the meaning of the terms in the description of the present disclosure. Accordingly, It will be understood that the terms, used herein, should be interpreted as having a meaning that is consistent with their meaning in the context of the relevant art and will not be interpreted in an idealized or overly formal sense unless expressly so defined herein.

An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

An application, in the description of the present exemplary embodiments, is software which executes a specific function. An application may create or use content. For example, an application may include a camera application, a document preparation application, an e-mail application, a schedule management application, and a content play application. However, the applications according to the exemplary embodiments are not limited thereto. An application may also be referred to as an application program.

Content, in the description of the present exemplary embodiments, is formed of an image, voice, sound, or text, which is created in a digital form. Types of such contents may be classified as a moving picture, a still picture, an electronic document, an electronic book, music, and contact information. However, the types of content are not limited thereto. For example, in the case of digital content, various types of content may be integrated into one content. That is, content based on social network services, such as a mobile messenger, an Internet phone, twitter, or a blog, and application-based content may be created in an environment in which various types of content may be integrated. Accordingly, types of content may be defined based on social network services or based on an application.

An attribute of content, in the description of the present exemplary embodiments, is used for mapping content with information about a cloud account or an external device. The attribute of content may also be referred to as attribute information about content. The attribute of content may be determined by using metadata of the content. However, when the content is created or played, the attribute of content may be determined by using an operation condition of a device and metadata of the content. The attribute of content may include information about the history of synchronization of the content with information about a cloud account or an external device, content type information, information about a content creation or play time, information about a location of the device during content creation or play, information about a network location during content creation or play, an attribute of an application in which the content is created or played, information about an activated cloud account, and information about the external device connected to another external device. However, the attribute of content is not limited thereto. Activated cloud account information may be information about a cloud account, which is activated at the device during creation or play of the content, or may include information about a cloud account, which is activated at the device when the attribute of content is determined. Information about the external device, connected to the device, may include information about the external device which is connected to the device during creation or use of the content, or may include information about the external device, which is connected to the device when the attribute of content is determined.

Operation condition information about the device may be obtained from information recorded in a log file of the device. However, a method of obtaining operation condition information about the device is not limited thereto. A log file is a file in which a use history of the device is recorded. The cloud account may also be referred to as user cloud account information. For example, according to exemplary embodiments, it may be understood that an operation of opening a document file in a document preparation application is included in an operation of playing the content.

According to exemplary embodiments, if there is information about a cloud account or an external device with which the content is mapped, before the attribute of the content is determined, the content synchronization history information, which includes information about the cloud account or information about the external device, may be used. The information about an external device, in the description of the present exemplary embodiments, may include a product name of the external device, for example, a digital TV, unique identification information about the external device, for example, a serial number of the external device, and a password of a user. The information about the external device may further include an identification (ID) of a user, according to a communication protocol between the device and the external device. A password and an ID of a user, included in the information about the external device, may be used to restrict users of the external device. The information about the external device corresponds to attribute information about the external device, mentioned throughout the description of the present exemplary embodiments.

According to exemplary embodiments, the attribute of the application includes information about a purpose of the application, for example, whether the application is for an office, a person, home, a friend, music, or a movie, based on a category of the application or a main function provided by the application. However, the attribute of the application is not limited thereto. The attribute of the application may be set during creation of the application. The attribute of the application may be determined based on a category of the application or a main function provided by the application. The attribute of the application may be referred to as attribute information about the application.

According to exemplary embodiments, location information about a network, during content creation or playing of the content, includes information about whether the network is a home network, a company network, or a public network in a public place such as a coffee shop or an airport. However, the location information about a network is not limited thereto. Whether the network is a home network, a company network, or a public network may be determined by using a service set ID (SSID) of the network. Location information about the device may be expressed as address information based on a global positioning system (GPS). However, a method of expressing the location information is not limited thereto. A cloud account, mentioned throughout the description of the present exemplary embodiments, includes a uniform resource locator (URL) for accessing a cloud service, a user ID used for a log-in, and a password of a user. Accordingly, in order to use a cloud service, a user may create a unique cloud account. A cloud service includes, for example, sCloud, uCloud, nDrive, Daum Cloud, SkyDrive, Dropbox, and iCloud, but it is not limited thereto. A cloud service may also be referred to as a cloud computing service. A cloud account may also be referred to as cloud account information according to situations. For example, a cloud account, used to determine an attribute of content, may also be referred to as user cloud account information. According to exemplary embodiments, it is to be understood that the user cloud account information is the same as a cloud account.

A user may create at least one cloud account for each cloud service. For example, if a user desires to use sCloud, uCloud, and Daum Cloud from among the cloud services mentioned above, the user needs to create at least one cloud account so as to use sCloud, create at least one cloud account so as to use uCloud, and create at least one cloud account so as to use Daum Cloud.

Additionally, a user may create a plurality of cloud accounts for one cloud service. For example, in the case of using Daum Cloud, a user may create a plurality of cloud accounts for Daum Cloud. In the case of using iCloud, a user may create an independent cloud account for each device using iCloud. Accordingly, in the case of using iCloud, a user may create and register a first cloud account by using a computer at a company, and a second cloud account by using a personally-owned tablet or a smartphone. According to an exemplary embodiment, when a cloud account is registered for a device, a user may set information regarding a purpose, for example, for a person, an office, a family, or a friend, for an attribute of a cloud account which will be registered. However, the attribute of a cloud account is not limited to as described, and a user may enter a desired keyword for the attribute of a cloud account. An attribute of a cloud account may be referred to as attribute information of user cloud account information. For example, a displayed attribute of a cloud account may also be referred to as attribute information about user cloud account information. A cloud account may also be referred to as a cloud computing account.

User input information, in the description of the present exemplary embodiments, may depend on a gesture by a user, user voice recognition, user face recognition, text, an image expressed by using a touch tool, control of a physical button, etc.

Touch gestures of a user may be defined according to an input device. That is, when an input device is based on a touch screen, touch gestures of a user may include a touch-based motion of the user to the touch screen, such as a tap, a touch and hold, a double-tap, a drag, panning, a flick, a drag-and-drop, and a sweep. However, touch gestures of a user are not limited thereto. A touch on a screen by a user may be done by using a finger or a touch tool. A touch tool may include a stylus pen. If a touch tool is implemented as a stylus pen, a memo, taken in the form of text or an image by using the stylus pen, is included in user input information.

If an input device is based on a motion sensor, user input information may depend on a gesture by a user, based on a motion of the device executed by a user. The motion of the device may include, for example, shaking or contacting the device. A motion sensor may include at least one of an acceleration sensor, a terrestrial magnetism sensor, a gyro sensor, and an orientation sensor.

If an input device is based on a camera, a gesture by a user may include a space gesture (movement through space) based on an image captured by a camera. That is, with regard to user input information, a gesture by a user may be based on a direction of moving a hand, a space gesture according to a moving hand, or a space motion, which is captured by using a camera.

For example, a pointing location on a screen may be changed according to a direction of moving a hand, and be determined when a user clenches a fist. If a plurality of contents are gathered at the determined location on a screen, and the first is opened and moved, the plurality of contents may be scattered and displayed on the screen. After the contents are scattered and displayed on the screen, and if the hand draws a circle in a clockwise direction, a return function is executed. Thus, a screen in which the plurality of contents is gathered at a certain location may be displayed. A camera may be formed based on an image sensor or an optical sensor.

If the input device includes a dial, a slider switch, a joystick, or a click wheel, user input information may depend on a physical control executed on the input device by a user. If the input device is based on an audio input device, user input information may depend on user voice recognition, based on natural language of the user. If the input device is based on a camera, user input information may include information based on user face recognition.

Hereinafter, the present disclosure will be described in detail by explaining exemplary embodiments with reference to the attached drawings. Like reference numerals in the drawings denote like elements, and their repeated description is omitted.

FIG. 1 is a configuration map of a content transmission system 100, according to an exemplary embodiment. Referring to FIG. 1, the content transmission system 100 includes a device 110, a network 120, 1st through nth cloud servers 130_1 through 130_n, and 1st through mth external devices 150_1 through 150_m. However, the content transmission system 100 is not limited to the configuration shown in FIG. 1. Also, according to exemplary embodiments, n and m are natural numbers of two or higher.

The content transmission system 100 may be formed using various components shown in FIG. 1. For example, the content transmission system 100 may be formed of the device 110, the network 120, and the 1st through nth cloud servers 130_1 through 130_n. Alternatively, the content transmission system 100 may be formed of the device 110, the network 120, and the 1st through mth external devices 150_1 through 150_m. Further, the content transmission system 100 may be formed of the device 110, the network 120, the 1st cloud server 130_1, and the 1st external device 150_1. Moreover, the content transmission system 100 may be formed of the device 110, the network 120, and the 1st cloud server 130_1. Also, the content transmission system 100 may be formed of the device 110, the network 120, and the 1st external device 150_1. However, the content transmission system 100 is not limited to the configurations described above.

Referring to FIG. 1, content created or used by the device 110 may be transmitted to at least one storage from among storages 131_1 through 131_n, respectively included in the 1st through nth cloud servers 130_1 through 130_n, and storages 151_1 through 151_m included in the 1st through mth external devices 150_1 through 150_m. If the transmitting of the content is being performed to synchronize content, stored in at least one storage from among the storages 131_1 through 131_n and the storages 151_1 through 151_m, with content stored in the device 110, the content transmission system 100 may also be referred to as a content synchronization system. The storages 131_1 through 131_n to be described hereinafter, respectively included in the 1st through nth cloud servers 130_1 through 130_n, may also be referred to as a cloud. Accordingly, it is to be understood that the storages 131_1 through 131_n to be presented in the description of an operation according to exemplary embodiments, respectively included in the 1st through nth cloud servers 130_1 through 130_n, are not limited to the storages 131_1 through 131_n.

The 1st through nth cloud servers 130_1 through 130_n may be defined as a cloud service based server, a cloud, a storage server or a storage unit which corresponds to user cloud account information. The 1st through mth external devices 150_1 through 150_m may be defined as a device or a storage, such as a cloud server, that may be accessed by using cloud account information. However, the 1st through mth external devices 150_1 through 150_m may also be defined as a device or a storage that may be accessed by using identification information about the 1st through mth external devices 150_1 through 150_m and a password of a user. The 1st through mth external devices 150_1 through 150_m may include an external device or a storage that uses a user identification (ID) in order to be connected to the device 100 according to a communication protocol with the device 110. The 1st through mth external devices 150_1 through 150_m may be implemented as a device that is substantially the same as the device 110.

The device 110 be implemented as a smart TV, a smartphone, a laptop computer, a tablet, a mobile device, a handheld device, a handheld PC, a personal digital assistant (PDA), or a digital consumer electronics (CE) device that has a function of communication and displaying. However, the device 110 is not limited thereto.

The device 100 may execute at least one application from among the applications described above. The application, executed by the device 110, may be an application that is set for the device 110, or an application that is downloaded from at least one device from among the 1st through nth cloud servers 131_1 through 131_n and the 1st through nth external devices 151_1 through 151_m. The device 110 may execute an application that is set for one of the 1st through nth cloud servers 131_1 through 131_n and the 1st through nth external devices 151_1 through 151_m that are connected via the network 120. Then, after executing the application, the device 100 may receive a result thereof, and output the result via the device 110.

The device 110 determines attribute information regarding content or uploading, so as to upload content which is created or played according to execution of an application. As described above, the device 110 may determine the attribute information when content is created or played by the application. However, the device 110 may also determine attribute information regarding content or uploading, so as to upload content which is stored in the device 110 according to one event from among a request for transmission of content by a user of the device 110, a request for execution of a content transmission application, a content transmission period which is set by a user of the device 110, a content transmission time which is set by a user of the device 110, and an idle state of the device. When determining attribute information for the uploading of the stored content, the device 110 may generate an integration list of the stored content and determine attribute information for the uploading of respective contents included in the generated integration list. Transmission of the content may include transmission of content for synchronizing the content.

A request for content transmission at the device 110 may be generated by controlling a content transmission menu item which is displayed on the device 110, by controlling a content transmission-dedicated button which is physically provided on the device 110, or by being based on information which is input by a user by using a remote control unit or other input device (not illustrated) of the device 110.

A request for executing a content transmission application may be generated according to information, which is input by a user, about shortcut information, for example, an icon of a content transmission application which is displayed on the device 110.

If content is created or played on the application, as described above, the device 100 may determine content attribute information which is used for uploading content and attribute information regarding uploading, by using metadata of the content and information stored in a log file of the device 110. However, in a circumstance other than when content is created or played on an application, the device 110 may determine attribute information about the content or attribute information regarding uploading by using metadata of the content. For convenience of description, attribute information about the content or attribute information regarding uploading may be referred to as attribute information about the content.

As shown in FIG. 2, attribute information about content may include many different types of information, including, for example, synchronization history information, content type information, information about a content creation or play time, information about a network location during content creation or play, attribute information about an application which created or played content, cloud account information about an activated user, and a connected external device. However, attribute information about content is not limited thereto. If content transmission is based on information about a connected external device, instead of cloud account information about a user, cloud account information about the activated user may be set as information about the connected external device.

According to exemplary embodiments, metadata of content may be created by an application that creates or uses the content. For example, if content is in the form of a music file, metadata of the content includes content type information, a song name, a singer's name, and time information about content creation. If the device 110 determines attribute information regarding content according to items shown in FIG. 2 by using metadata of the music file, the determined attribute information about content may be content type information, information about a content creation time, and attribute information about an application.

FIG. 2 is an example diagram illustrating determining, by the device 110, attribute information regarding content or uploading according to an exemplary embodiment. Contents 1 through 4, shown in FIG. 2, are examples of content of which attribute information regarding the content when the content is created or played on an application is determined. Content 5 is an example of content of which attribute information about the content which is stored in the device 110 is determined.

Attribute information about the contents 1 through 4, shown in FIG. 2, is stored in the device 110. The attribute information about the contents 1 through 4 may be read from the device 110 and used, according to one event from among a request for transmission of the content by a user of the device 110, a request for execution of a content transmission application, a content transmission period which is set by a user of the device 110, a content transmission time which is set by a user of the device 110, and an idle state of the device.

The content 5, shown in FIG. 2, is associated with attribute information regarding the content determined by using metadata of the content which is stored in the device 110, when the content is transmitted according to one event from among a request for execution of a content transmission application, a content transmission period which is set by a user of the device 110, a content transmission time which is set by a user of the device 110, and an idle state of the device.

Referring to attribute information regarding the content 1, shown in FIG. 2, the content 1 includes history information which is synchronized with a first cloud account, a type of the content 1 is a document file, and a content creation or play time (playback time) is 5 PM. Additionally, a location of the device 110, during creation or playing of the content, is 'A', and a location of a network during creation or playing of the content is at a company. An attribute of an application in which the content is created or played is for document preparation. The content 1 does not include activated user cloud account information during creation or play of the content. Also, the content 1 does not include information about an external device which is connected to the device 110 during creation or playing of the content. 'A' may be expressed as address information based on global positioning system (GPS), although is not limited thereto.

Referring to attribute information regarding the content 2, shown in FIG. 2, the content 2 does not include synchronization history information, a type of the content 2 is a music file, and a content creation or play time is 8 PM. Additionally, a location of the device 110, during creation or playing of the content 2, is 'B', and a network during creation or play of the content 2 is a public network. An attribute of an application is playing music. The content 2 does not include activated user cloud account information during creation or playing of the content 2. Also, the content 2 does not have an external device which is connected to the device 110 during creation or playing of the content 2. 'B' may be expressed as address information based on GPS, although is not limited thereto.

Referring to attribute information regarding the content 3, shown in FIG. 2, the content 3 does not include synchronization history information, a type of the content 3 is a moving picture, and a content creation or play time is 11 pm. Additionally, a location of the device 110, during creation or playing of the content 3, is 'C', and a network during creation or playing of the content 3 is a home network. An attribute of an application is playing a movie. Activated user cloud account information, during creation or playing of the content 3, is a second cloud account. Also, the content 3 does not include information about an external device which is connected to the device 110 during creation or playing of the content 3. 'C' may be expressed as GPS-based address information, although is not limited thereto.

Referring to attribute information regarding the content 4, shown in FIG. 2, the content 4 does not include synchronization history information, a type of the content 4 is a still picture, and a content creation or play time is 8 AM. Additionally, a location of the device 110, during creation or playing of the content 4, is 'D', and a network during creation or playing of the content 4 is a public network. Attribute information about an application is indicated as a camera. The content 4 does not include activated user cloud account information during creation or playing of the content. Also, the content 4 does not include an external device which is connected to the device 110 during creation or playing of the content 4. 'D' may be expressed as GPS-based address information, although is not limited thereto.

Referring to attribute information regarding the content 5, shown in FIG. 2, the content 5 does not include metadata, or metadata of the content 5 does not include information which is necessary for determining attribute information regarding the content 5. However, when the attribute information regarding the content 5 is determined, a third cloud account is activated in the device 110. Accordingly, the attribute information about the content includes information about the third cloud account as information about the activated user cloud account. As shown in the attribute information about the content 5 shown in FIG. 2, when attribute information regarding content is determined by the device 110, attribute information may not be obtained. For example, in the case of the content 5 shown in FIG. 2, if information about an activated user cloud account or information about connected external information is not included in the device 110, the device 110 may not obtain any attribute information as a result of determining attribute information about the content 5.

The 1st through 3rd cloud accounts, mentioned in FIG. 2, may also be referred to as 1st through 3rd user cloud account information.

When attribute information about the content is determined, the device 110 maps at least one piece of user cloud account information, which corresponds to the attribute information about the content, with the content. Referring to an example shown in FIG. 2, the content 1 may be mapped with the first cloud account, based on the synchronization history information. The content 3 may be mapped with the second cloud account, based on the activated cloud account information. The content 5 may be mapped with the third cloud account, based on the activated cloud account information. The contents 2 and 3 may be mapped with a cloud account which is set for the device 110 as a default. Additionally, as described for the content 5, content of which an attribute is not determined may be mapped with the cloud account which is set for the device 110 as a default.

In the case of the content 2 or 4, shown in FIG. 2, the device 110 may analyze attribute information about each of the different units of content according to preset criteria, and map the content with user cloud account information based on a result of the analysis. For example, if an attribute of user cloud account information is set for personal or office use, a criterion, which is preset for analyzing attribute information regarding content, is set to be used to determine if the content is for personal use or for office use.

For example, content, of which a creation or play time is from 8 AM to 7 PM, is determined as being for office use. Thus, a criterion for analyzing attribute information regarding content, so as to determine content which is created or played at a time other than the described time as not being for office use, may be set for the device 110. Additionally, content, of which a network is a company network during creation or playing of the content, is determined as being for office use. Then, a criterion for analyzing attribute information regarding content, so as to determine content which is created or played at a network other than the described network as not being for office use, may be set for the device 110. Additionally, content, of which a location of a device in which content is created or used is "A", is determined as being for office use. Then, a criterion for analyzing attribute information regarding content, so as to determine content which is created or played at a network location other than the described location as not being for office use, may be set for the device 110.

The above example is described in connection with office use, so as to help to understand a criterion for analyzing attribute information regarding content. However, the criterion may be further categorized and defined, according to information defined for attribute information of a user cloud account. That is, if attribute information of the user cloud account information is defined as for a person, an office, a family, and a friend, the criterion for analyzing attribute information regarding content, which is set for the described device 110, may be set to determine if the content is for a person, an office, a family, or a friend.

Accordingly, if the contents 2 and 4, shown in FIG. 2, are determined as not to be for office use, the device 110 may map the contents 2 and 4 with a cloud account of which attribute information of user cloud account information is not for office use. However, attribute information regarding content and the criterion for analyzing attribute information regarding content are not limited thereto.

The device 110 transmits content to a cloud which corresponds to the mapped user cloud account information. That is, if, for example, a cloud which corresponds to the mapped user cloud account information is a cloud based on the first storage unit 130_1 shown in FIG. 1, the content is transmitted to the first storage unit 130_1. User cloud account information which is mapped for each unit of content may be plural. If a cloud, which corresponds to user cloud account information that is mapped with the content, is a cloud based on an nth storage unit **130_*n* and an mth storage unit 150_*m*, the device 110 transmits the content to the nth storage unit 130_*n* and the mth storage unit 150_*m*. Then, the device 110 may, for example, store only metadata which includes a thumbnail of the content, instead of the content, and transmit the content to the nth storage unit 130_*n* and the mth storage unit 150_*m*. Accordingly, the device 110** may access the content which is stored in the cloud, by using the metadata which includes the thumbnail of the content.

As described above, the device 110 may create an integration list related to at least one unit of content that is created or played by the application by executing an application, and thus, transmit or synchronize the content. The integration list is a list based on all contents that are created or played on the application by executing an application. For example, if m applications can be executed by the device 110, the device 110 generates an integration list that is included in content which is created or played by executing respective M applications.

The content, which may be stored in the device 110, may be synchronized with the content which is stored in the storages 131_1 through **131_*n* and 151_1 through 151_*n* according to a request for transmitting the content. The device 110 may generate the integration list so as to synchronize the content, according to one event from among a selection of a content synchronization menu item by a user of the device 110, a request for executing, by a user of the device 110, a content transmission application, a content transmission period which is set by a user of the device 110, a content transmission time which is set by a user of the device 110, and an idle state of the device 110**.

A selection of a content synchronization menu item by a user of the device 110 may be made based on information input by a user by using the content synchronization menu item which is displayed on the device 110, a content synchronization-dedicated button which is physically provided on the device 110, or a remote control unit (not illustrated) of the device 110.

A request for executing, by a user of the device 110, a content synchronization application may be generated according to information, which is input by a user, related to shortcut information, for example, an icon of a content synchronization application which is displayed on the device 110. The device 110 maps at least one piece of user cloud account information for each unit of content included in the created integration list. As described with reference to FIG. 2, the mapping of the user cloud account information for each unit of content may determine attribute information regarding content. Then, the mapping operation of the user cloud account information for each unit of content may map the content with the user cloud account information based on attribute information of the determined content, or may analyze attribute information of the determined content and, by using a result of comparing a result of the analyzing with a preset criterion and using an attribute of user cloud account information, map the content with the user cloud account information.

Each unit of content which is included in the integration list may be mapped with at least one piece of user cloud account information, by using user input information.

The device 110 synchronizes content, stored in a cloud which corresponds to the mapped user cloud account information, with each unit of content included in the integration list. A cloud may include at least one storage from among the 1st through nth storages 131_1 through 131_n and the 1st through mth storages 151_1 through 151_m. Content synchronization may be executed by using at least one type of information from among information about the content capacity, information about a content creation time, a hash value of the content, and a name of the content. Accordingly, if content transmission is executed for content synchronization, the device 110 may transmit the above-mentioned information about the content which is desired to be synchronized with a cloud that corresponds to the mapped user cloud account information.

For example, if a capacity of content is small, content synchronization may be executed by using a hash value of the content. If a capacity of content is large, content synchronization may be executed by using information about a name and a creation time of the content. In order to determine if a capacity of content is large or small, the device 110, the 1st through nth cloud servers 130_1 through 130_n, and the 1st through mth external devices 150_1 through 150_m, may have a reference value. A reference value may be determined according to a time required to determine a difference between content stored in the device 110 by using a hash value, and content stored in the 1st through nth cloud servers 130_1 through 130_n and the 1st through mth external devices 150_1 through 150_m. That is, if the required time is short, the reference value may be set to use a hash value of the content. If the required time is long, the reference value may be set not to use a hash value of the content. A reference value which may be used to determine whether the required time is short may be set for the device 110, the 1st through nth cloud servers 130_1 through 130_n, and the 1st through mth external devices 150_1 through 150_m. Experimentally obtained values may be used as such reference values.

According to exemplary embodiments, it is to be understood that content transmission at the device 110 includes the content synchronization. This feature is because, for example, when the device 110 transmits the content to the 1st storage unit 131_1, if the same content is stored in the 1st storage unit 131_1, the 1st storage unit 131_1 may synchronize the content transmitted from the device 110 with content which is stored in the 1st storage unit 131_1.

Figure 13:
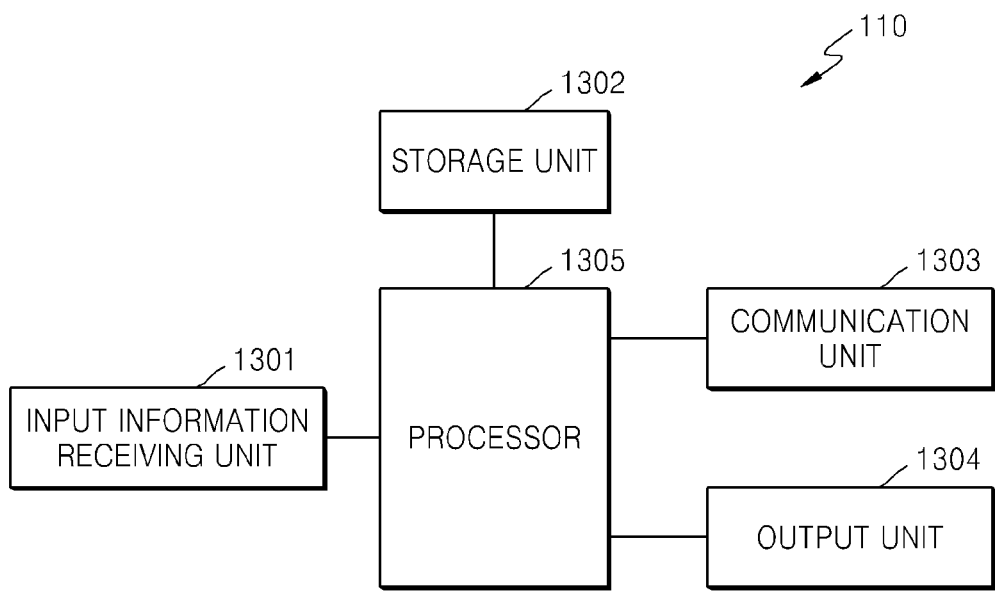
FIG. 13 is an example of a functional block diagram of a device shown in FIG. 1.

The network 120 includes a wired network and a wireless network. The network 120 will be described in detail when a communication unit 1303, shown in FIG. 13, is described.

The 1st through nth cloud servers 130_1 through 130_n may store information, as requested by the device 110, and provide the stored information to the device 110. According to an exemplary embodiment, the 1st through nth cloud servers 130_1 through 130_n may respectively execute authentication processing based on at least one piece of user cloud account information. If access of the device 110 to the 1st through nth cloud servers 130_1 through 130_n is allowed by authentication processing, the device 110 may transmit content to the 1st through nth cloud servers 130_1 through 130_n, or may synchronize content, which is stored in each of the storages 131_1 through 131_n of the 1st through nth cloud servers 130_1 through 130_n, with content which is created or used by an application executed by the device 110.

The 1st through nth cloud servers 130_1 through 130_n may store at least one application that may be executed at the device 110. As requested by the device 110, the 1st through nth cloud servers 130_1 through 130_n may provide at least one application to the device 110. According to an exemplary embodiment, the 1st through nth cloud servers 130_1 through 130_n and the 1st through mth external devices 150_1 through 150_m may not transmit an application to the device 110. Instead, the 1st through nth cloud servers 130_1 through 130_n and the 1st through mth external devices 150_1 through 150_m may execute an application according to a signal which is received from the device 110, and may transmit or share information, generated by execution of the application, to or with the device 110. The 1st through nth cloud servers 130_1 through 130_n may include an application-providing server or support an application-providing function.

The 1st through mth external devices 150_1 through 150_m have a similar function to the device 110. Similar to the 1st through nth cloud servers 130_1 through 130_n, the 1st through mth external devices 150_1 through 150_m may provide the device 110 with a service based on service cloud account information.

FIG. 3 is an operation flowchart illustrating a content transmission method according to an exemplary embodiment, and is based on the content transmission system 100 of FIG. 1.

As described with reference to FIG. 1, the content transmission method, shown in FIG. 3, may be executed based on at least one from among a selection of a content transmission menu item by a user, a request for executing, by the user, a content transmission application, a content transmission period which is set by the user, a content transmission time which is set by the user, and an idle state of the device 110.

Referring to FIG. 3, in operation S301, the device 110 determines attribute information about at least one unit of content. The attribute information about at least one unit of content is as described with reference to FIGS. 1 and 2, and is determined as described with reference to FIGS. 1 and 2. That is, as shown in FIG. 2, an attribute of content is determined based on at least one type of information from among synchronization history information about content based on at least one user cloud, type information about the content, creation or play time information about the content, information about a network location during content creation or playing of the content, user cloud account information activated during creation or playing of the content, attribute information about an application which created or played the content, and information about an external device connected during creation or playing of the content.

If attribute information about the content is determined, in operation S302, the device 110 maps the content with at least one piece of user cloud account information, based on attribute information about the determined content. The mapping of the content with the user cloud account information may be executed based on attribute information of the user cloud account information. The attribute information about the user cloud account information may be set by a user of the device 110.

Figure 4:
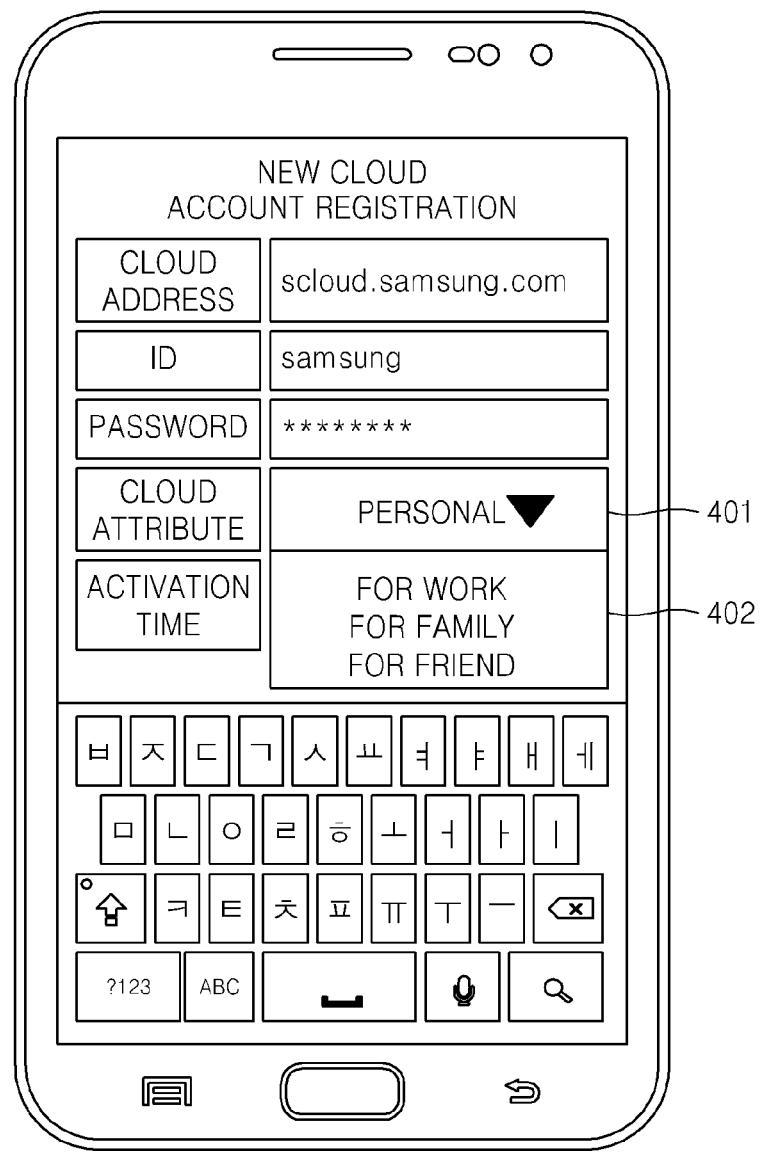
FIG. 4 is an example screen of registering a cloud account according to an exemplary embodiment.

FIG. 4 is an example screen of registering new user cloud account information according to an exemplary embodiment. A new cloud account, shown in FIG. 4, corresponds to the new user cloud account information. Referring to FIG. 4, a user may set address information of an account of a user cloud to be newly registered, a user identification (ID), a user's password, an attribute of a cloud account, and activated visual information. Referring to FIG. 4, when a selection by the user for a cloud attribute information input window 401 is detected, the device 110 displays a drop list 402, which includes attribute information about cloud account information that may be set, based on the input window 401. Referring to the drop list 402 based on the input window 401, attribute information about cloud account information that may be set is, for example, information for a person, work, a family, and a friend. For example, attribute information about cloud account information may be set by a keyword that is input by a user. As such, the attribute information about the cloud account information is included in registration information about the at least one User cloud account information.

In operation S303, the device 110 transmits content to a cloud, which is determined based on user cloud account information that is mapped with the content, based on a result of the mapping. That is, the device 110 may determine the cloud based on the mapped user cloud account information, and then transmit the content to the determined cloud. The cloud may also be referred to as a cloud service based external device. The device 110 may execute authentication processing for the user cloud account information that is mapped with each unit of content, before transmitting the content. In FIG. 3, a cloud, which corresponds to user cloud account information, is illustrated as the 1st through nth cloud account-based servers 130_1 through 130_n. However, FIG. 3 may be re-defined that the content may be transmitted to at least one from among the 1st through nth cloud account-based servers 130_1 through 130_n and the 1st through mth external devices 150_1 through 150_m. Each unit of content may be transmitted to a cloud which is determined based on at least one cloud account information of each other user.

Figure 5:
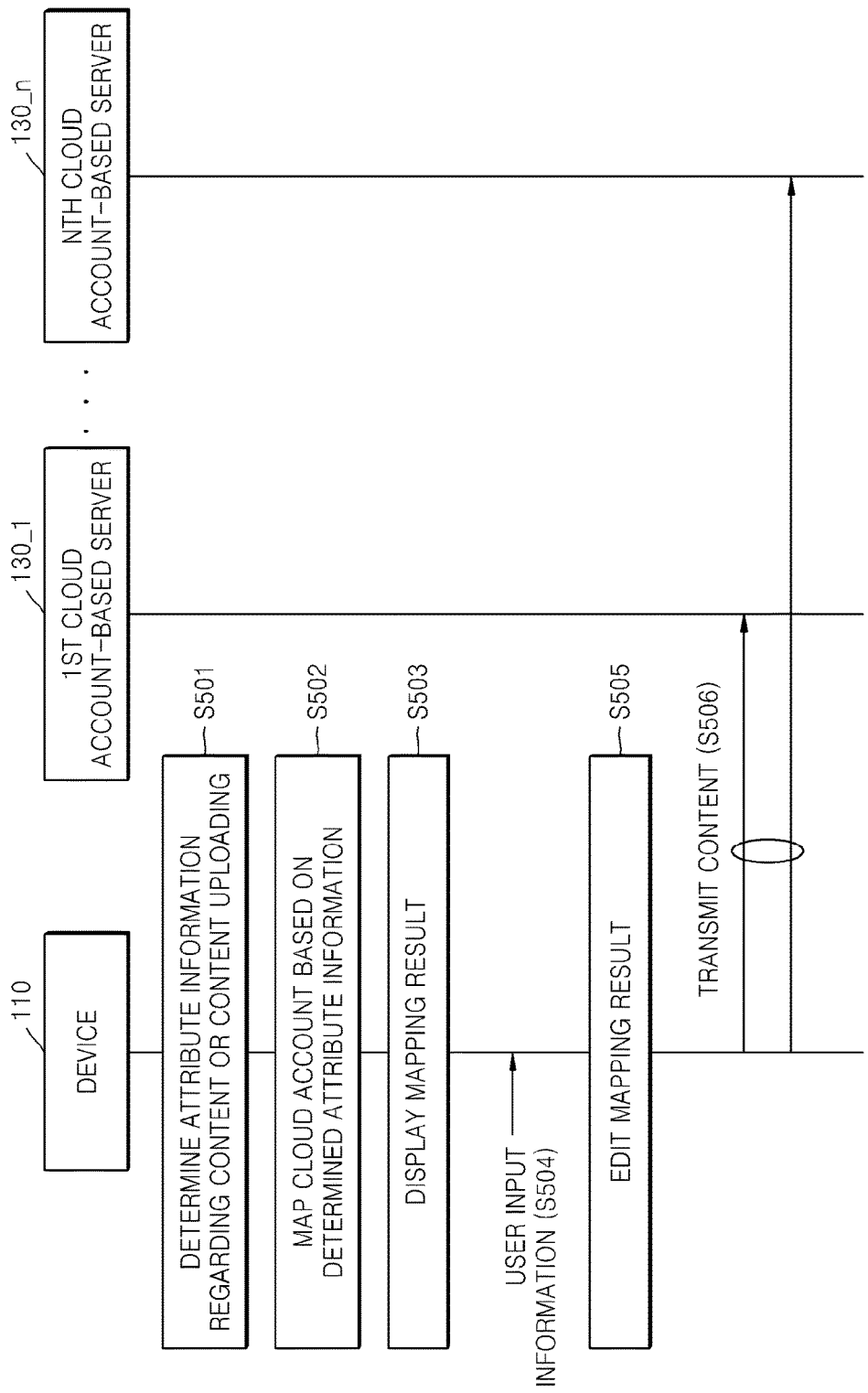
FIG. 5 is an operation flowchart illustrating a content transmission method according to another exemplary embodiment, and is based on the content transmission system of FIG. 1.

FIG. 5 is an operation flowchart illustrating a content transmission method according to another exemplary embodiment, and is based on the content transmission system 100 of FIG. 1. FIG. 5 shows an example of adding a function of editing a result of the mapping, shown in the operation flowchart of FIG. 3, by using information. Accordingly, operations S501, S502, and S506 are identical to operations S301 through S303 shown in FIG. 3. Thus, a repeated description thereof is not provided.

Figure 6:
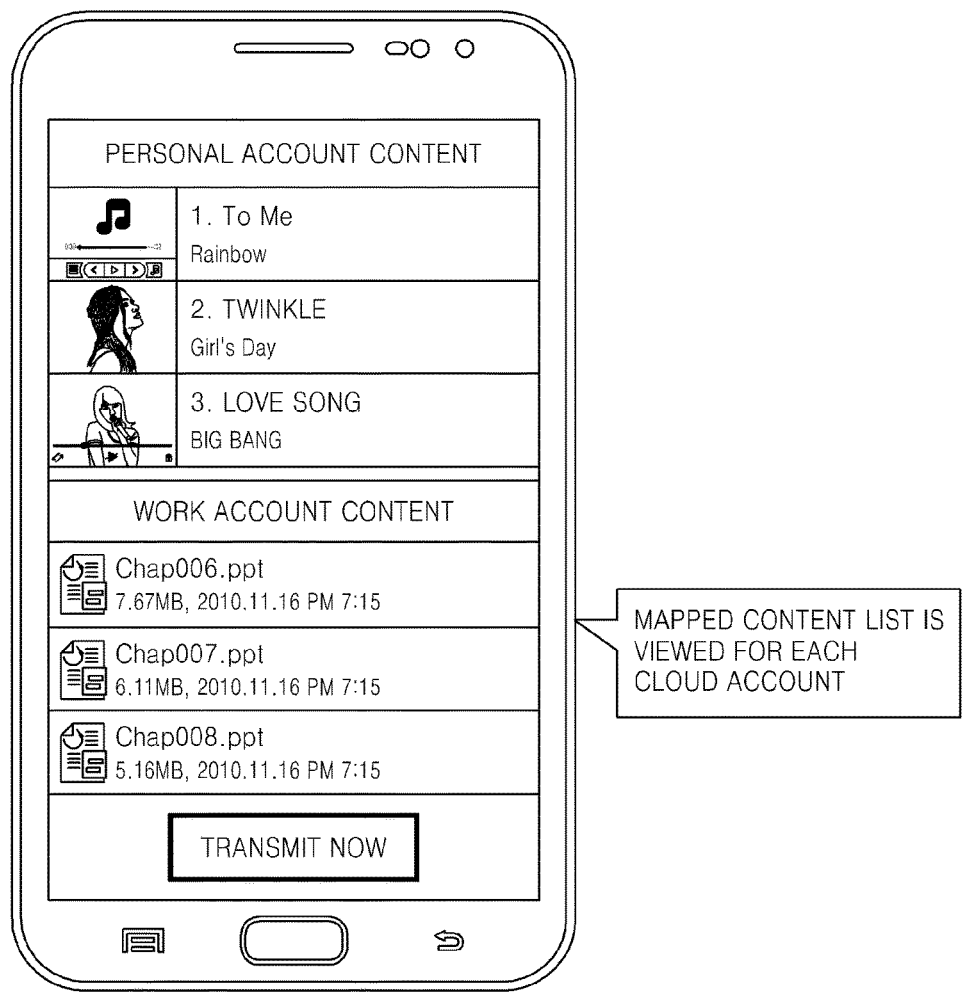
FIG. 6 is an example screen of a content list based on a cloud account according to an exemplary embodiment.
Figure 7:
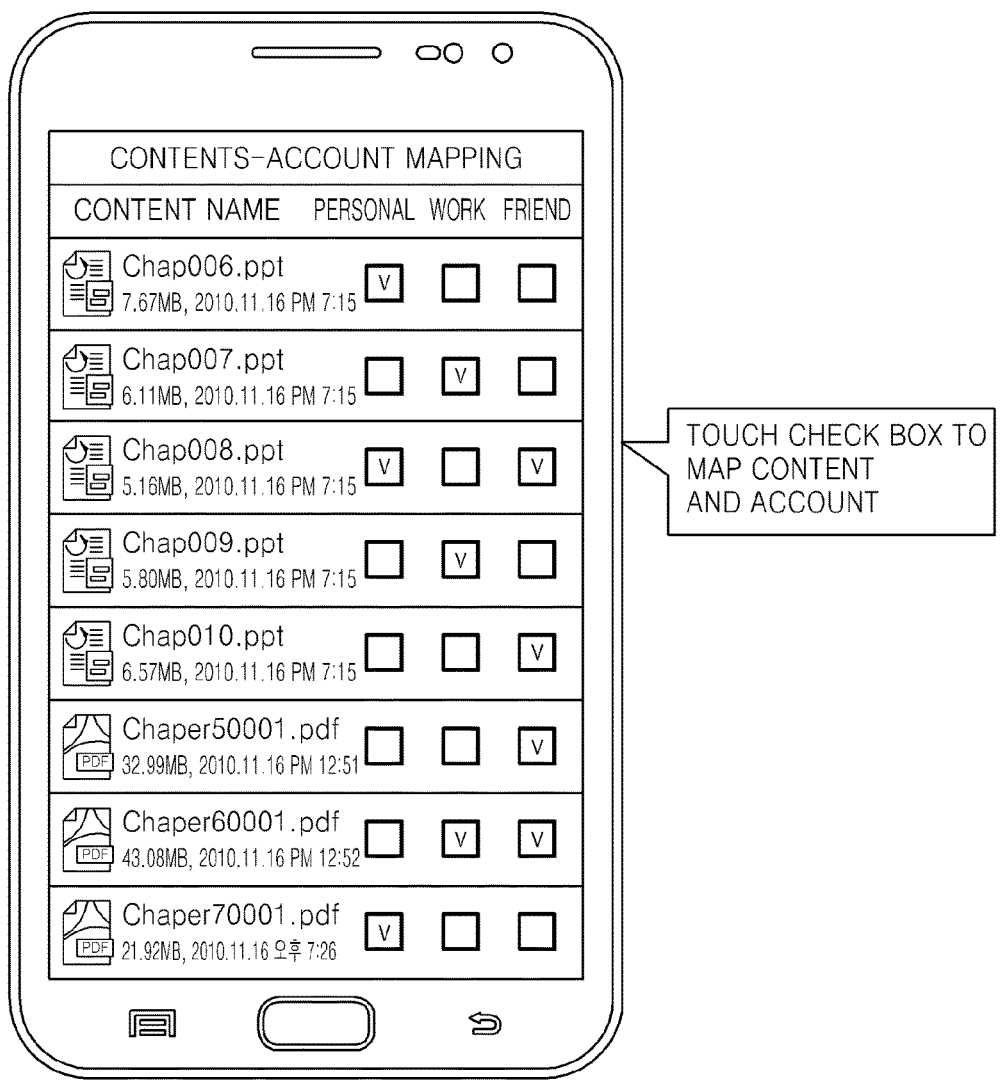
FIG. 7 is an example of an integration list of contents according to an exemplary embodiment.
Figure 8:
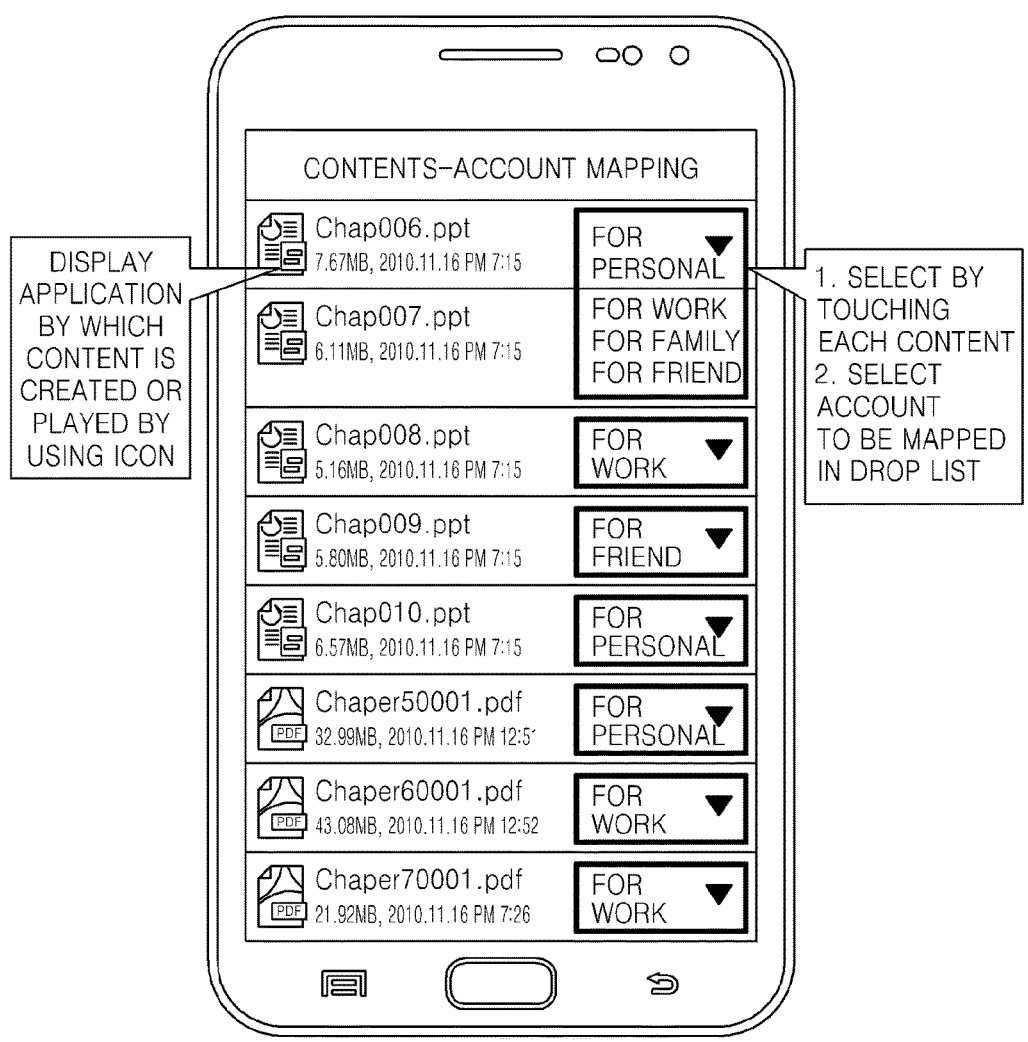
FIG. 8 is another example of an integration list of contents according to an exemplary embodiment.

In operation S503, the device 110 displays a result of mapping content with user cloud account information. A device 110 may display the result on a screen as shown in FIGS. 6 through 8. FIG. 6 shows an example of displaying a list of contents, which are mapped with pieces of user cloud account information, based on attribute information about the user cloud account information. FIG. 7 shows an example of an integration list in which attribute information of user cloud account information, mapped with each unit of content, is checked in a check box. FIG. 8 is an example of an integration list in which user cloud account information, mapped with each unit of content, is marked. If user cloud access information is marked, user cloud access information, which may be selected, is displayed in a drop list.

In operation S504, as shown in FIG. 6, user input information is input, for example, by long-touching "LOVE SONG" included in a list of content which is mapped with personal user cloud account information, and then dragging "LOVE SONG" into an area in which a list of content, mapped with work user cloud account information, is displayed. Then, in operation S505, the device 110 may edit a list of content so that the "LOVE SONG" content is included in the list of content which is mapped with work user cloud account information.

In operation S504, if it is detected that user input information that is input in operation S504 based on the screen shown in FIG. 7 corresponds to a check on a check box of another type of attribute information, other than attribute information about currently mapped user cloud account information, in operation S505, the device 110 may add user cloud account information that is mapped with content. For example, in the case of "chapter60001.pdf", if a check in a check box for a friend is detected when a check box for office is checked, the device 110 may edit a mapping result by adding user cloud account information for the friend to user cloud account information for the office.

When user cloud account information is set so that one piece of user cloud account information is mapped with one unit of content, if the device 110 includes user cloud account information which is mapped with content, and if it is detected that a check box, which includes attribute information different from attribute information about the mapped user cloud account information, is checked by user input information, the integration list, shown in FIG. 7, is edited so that content is mapped with user cloud account information which includes attribute information of a recently checked check box.

When user input information, input in operation S504 based on the screen shown in FIG. 8, corresponds to a touch on the currently mapped user cloud account information, the device 110 may display a drop list which includes attribute information about user cloud account information that may be selected. Thus, the device 110 may change attribute information about user cloud account information which is mapped with the content, based on a selection made using the displayed drop list. Accordingly, the device 110 may edit a result of mapping the content with the user cloud account information. In operation S506, based on a result of the editing, the device 100 transmits the content to a cloud which is determined based on the mapped user cloud account information.

If user input information, input in operation S504, corresponds to a request for content transmission, the device 110 does not execute operation S505, and proceeds to operation S506. In this case, according to the mapping result which is displayed in operation S503, content is transmitted to a cloud that is determined based on the mapped user cloud account information.

A list of icons indicating the content, shown in FIGS. 6 through 8, FIGS. 10A through 10E, FIGS. 11A through 11D, and FIG. 12, may include information which represents an application in which content is created or played. Information which represents an application may include information such as a thumbnail.

FIG. 9 is an operation flowchart illustrating a content transmission method according to another exemplary embodiment, and is based on the content transmission system 100 of FIG. 1. FIG. 9 shows an example of creating and displaying an integration list, mapping user cloud account information with content based on the displayed content included in the displayed integration list, and transmitting the content to a cloud which is determined based the mapped user cloud account information.

In operation S901, the integration list, created by the device 110, is displayed on the device 110. The integration list may be displayed as illustrated in FIGS. 10A through 10E. FIGS. 10A through 10E are examples of a screen that is displayed on the device 110, according to an exemplary embodiment.

Figure 10A:
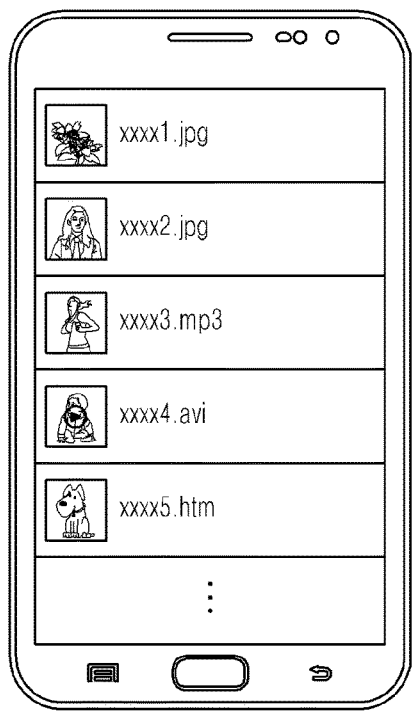
FIGS. 10A through 10E are diagrams of an example screen of the integration list of FIG. 9.

The integration list, displayed in operation S901, may be formed of files, as illustrated in FIG. 10A. Each file, shown in FIG. 10A, may be regarded as one content (e.g., one unit of content). Accordingly, referring to FIG. 10A, contents, such as xxxx1.jpg, xxxx2.jpg, xxxx3.mp3, xxxx4.avi, and xxxx5.htm are included in the integration list.

As illustrated in FIG. 10A, the integration list includes identification information about content and identification information about an application in which the content is created or played for each unit of content. That is, xxxx, shown in FIG. 10A, may be defined as identification information such as a date or a name of the content. An extension may be used as identification information about an application, because an application, which creates or uses content, is often known based on the extension. Alternatively, application identification information may be defined in the form of text or an image, instead of using an extension. For example, in the case of voice-recorded content, an image, in correspondence with text information or a recording indicating a "voice recording", may be displayed as identification information about an application. Otherwise, as described above, an integration list may be created or displayed by including image information that may identify an application using an image which represents content. Additionally, capacity information about the content may be displayed.

Figure 10B:
Figure 10C:
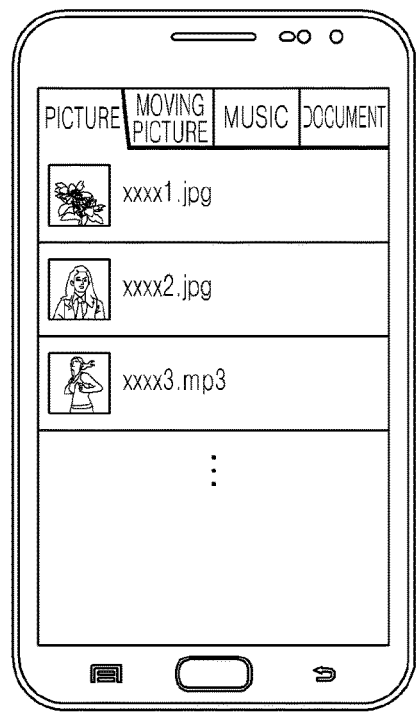
Figure 10D:
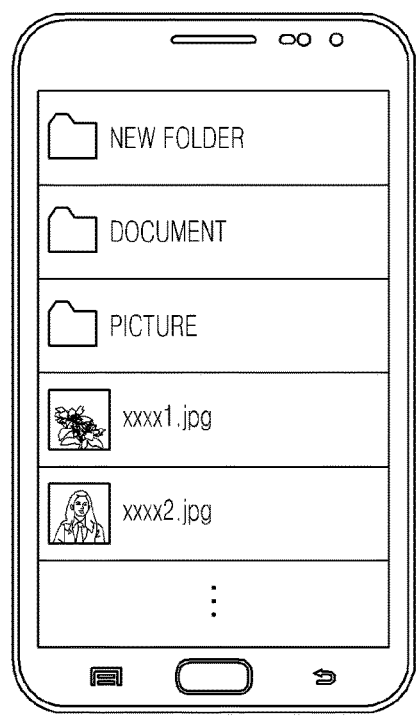
Figure 10E:
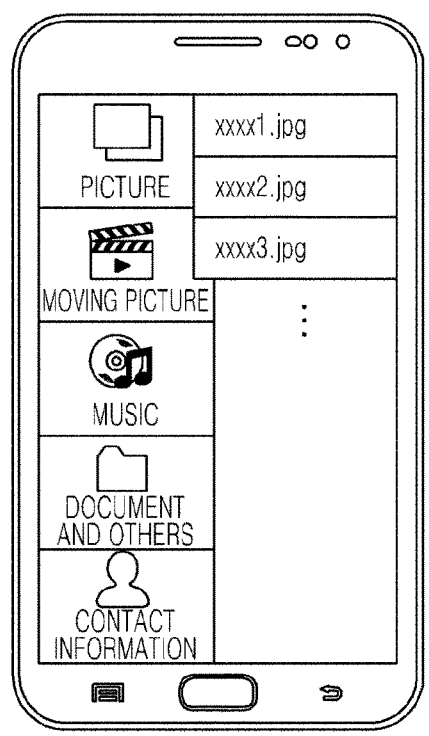

FIGS. 10B and 10C show examples of a screen in which the integration list shows content that is sorted according a category type. FIG. 10C shows an example of a screen of an integration list in which the category types are configured in the form of tabs. FIG. 10D shows an example of a screen of an integration list in which folder units and file units are integrated. FIG. 10E shows an example of illustrating an integration list for each category type and providing content, included in each category type, in the form of a drop-down menu.

However, screens of an integration list to be displayed on the device 110 are not limited to the examples shown in FIGS. 10A through 10E. A form of an integration list, which is to be created and displayed from among the integration lists shown in FIGS. 10A through 10E, may depend on a condition of creating an integration list. A condition of creating an integration list may be set and changed by a user, but may be also set by default when the device 110 is manufactured.

Referring back to FIG. 9, in operation S902, the device 110 displays at least one piece of user cloud access information that may be mapped. FIGS. 11A through 11D show examples of a screen for displaying user cloud account information according to an exemplary embodiment. The user cloud account information, shown in FIGS. 11A through 11D, is information, such as an image, which is based on attribute information about the user cloud account information.

Figure 11A:
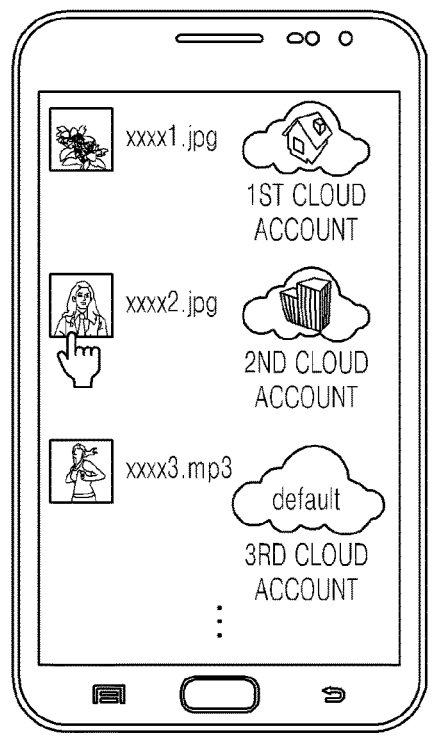
FIGS. 11A through 11D are diagrams of an example screen for explaining examples of displaying a cloud account that may be mapped in FIG. 9.

FIG. 11A is an example of a screen if input information, selected by a user for content 'xxxx2.jpg' which is included in an integration list, is generated, the screen displaying 1st through 3rd cloud accounts that may be mapped with the content 'xxxx2.jpg' in a vertical list. As described with reference to FIG. 1, the 1st through 3rd cloud accounts that may be mapped may be user cloud account information which determines attribute information regarding content, based on at least one piece of information from among synchronization history information about content, content type information, information about a content creation or play time, information about a location of a device during content creation or playing, information about a network location during content creation or playing, user cloud account information which is set for the device by default, cloud account information about an activated user during content creation or playing, attribute information about an application, and attribute information about user cloud account information, and which corresponds to attribute information about the determined content. FIGS. 11A through 11D show examples of a screen for displaying user cloud account information that is mapped with content in a content unit or in a file unit.

Figure 11B:
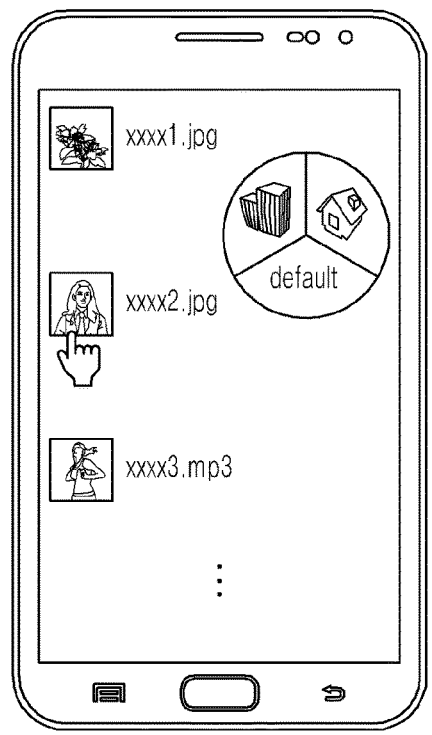

FIG. 11B is an example of a screen if input information, selected by a user for content 'xxxx2.jpg' which is included in an integration list, is generated, the screen displaying 1st through 3rd cloud accounts that may be mapped with the content 'xxxx2.jpg' in the form of a circle. Cloud accounts, illustrated in FIGS. 11A through 11D, may also be referred to as attribute information about user cloud account information.

Figure 11C:
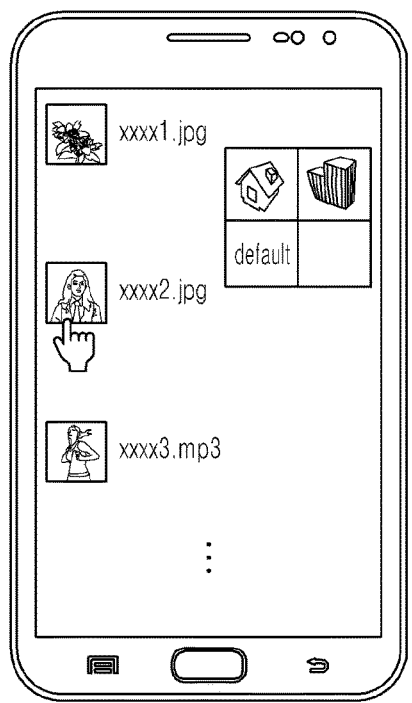

FIG. 11C is an example of a screen if input information, selected by a user for content 'xxxx2.jpg' which is included in an integration list, is generated, the screen displaying 1st through 3rd cloud accounts that may be mapped with the content 'xxxx2.jpg' in the form of a checkerboard.

Figure 11D:
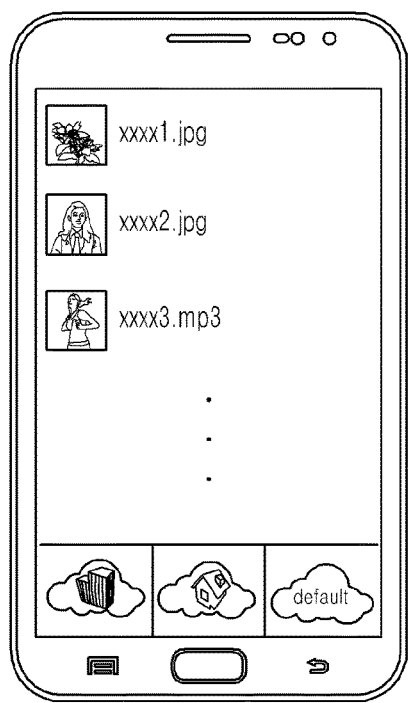

FIG. 11D is an example of a screen if input information, selected by a user for content 'xxxx2.jpg' which is included in an integration list, is generated, the screen displaying 1st through 3rd cloud accounts that may be mapped with the content 'xxxx2.jpg' in a horizontal form. FIG. 11D shows a screen for displaying 1st through 3rd cloud accounts in a horizontal form on a lower part of the screen. However, the 1st through 3rd cloud accounts in a horizontal form may be displayed in an area which is adjacent to selected content. It is understood that the examples in FIGS. 11A-11D are exemplary only, and many other ways of displaying cloud accounts mapped to content may also be implemented in accordance with other exemplary embodiments.

Figure 12:
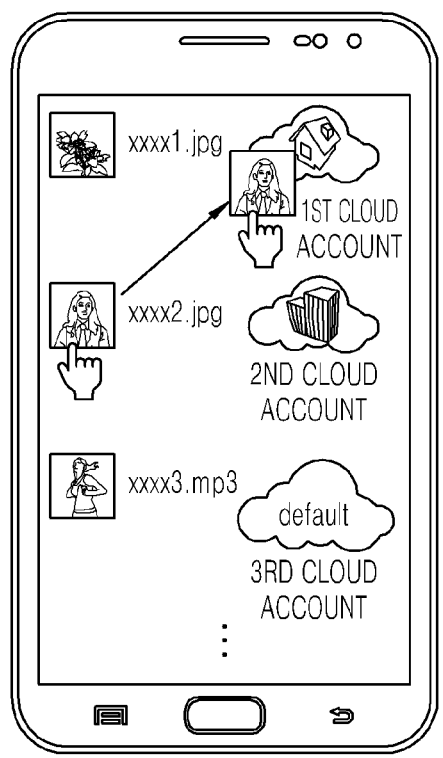
FIG. 12 is an example screen which explains mapping between the content and the user cloud account of FIG. 9.

Referring to FIG. 9, in operation S903, the device 110 maps content with the displayed user cloud account information. FIG. 12 shows an example of a screen for illustrating a process of mapping the displayed content with the displayed user cloud access information.

Referring to FIG. 12, if the content "xxxx2.jpg" on the device 110 is long-touched (e.g., continuously touched for a predetermined period of time), and then user input information for dragging and dropping the content "xxxx2.jpg" to a 1st cloud account is detected, the device 110 maps the content "xxxx2.jpg" with the 1st cloud account. However, the mapping of the content with the user cloud account information is not limited to the technique illustrated in FIG. 12.

For example, the content may be mapped with the desired user cloud account information by long-touching the content, and then, long-touching the desired user cloud account information from among displayed pieces of user cloud account information.

Additionally, if a plurality of pieces of user cloud account information are to be mapped to one unit of content, as illustrated in FIG. 12, the content is long-touched, and then, a first desired user cloud account information, that is, first cloud account information is mapped with the content based on user input information indicating a dragging and dropping operation to the first desired user cloud account information. Then, a next desired user cloud account, that is, second cloud account information, is mapped to the content by using user input information indicating a dragging and dropping operation to the next desired user cloud account information.

As described above, the user input information may be based on user voice recognition. The user cloud access information, shown in FIG. 12, may also be referred to as attribute information about the user cloud access information, as described with reference to FIGS. 11A-11D.

When at least one piece of user cloud access information is mapped with each unit of content that is included in the integration list, in operation S904, the device 110 certifies (e.g., authenticates) 1st through nth cloud accounts, mapped as illustrated in FIG. 3, with the 1st through nth cloud servers 130_1 through 130_n. Then, in operation S905, the device 110 transmits the content to a server or a cloud which is determined based on the certificated user cloud account information.

According to exemplary embodiments, the integration list which is created and displayed in operation S901, as shown in FIG. 9, may be displayed to include a check box as shown in FIG. 7, or to provide a drop list as shown in FIG. 8. If the integration list is displayed as shown in FIG. 7, operations S901 and S902 may be simultaneously executed. If the integration list is displayed as shown in FIG. 8, when a selection of an area, in which user cloud account information and attribute information that are mapped for each unit of content are displayed, is detected, a drop list may be displayed in operation S902. Mapping of the user cloud account information with the content may be executed by selecting attribute information about the user cloud access information, based on the check box shown in FIG. 7 and the drop list shown in FIG. 8.

FIG. 13 is an example of a functional block diagram of the device 110 shown in FIG. 1. Referring to FIG. 13, the device 110 includes an input information receiving unit 1301, a storage unit 1302, a communication unit 1303, an output unit 1304, and a processor 1305.

The input information receiving unit 1301 receives the user input information. Accordingly, the input information receiving unit 1301 is configured to receive various types of input information, such as, for example, a touch-based gesture made by a user, a user voice to perform user voice recognition, a user image to perform user face recognition, text or an image expressed by a touch tool, a control of a physical button, and a signal according to information transmitted by a remote controller (not illustrated). Thus, the input information receiving unit 1301 may include a touch screen, an audio signal input unit such as a microphone, a camera, a physical button, and a remote signal-receiving unit based on wireless communication. The remote signal-receiving unit may be configured to be identical or similar to a wireless communication unit 1601 which will be described later with reference to FIG. 16.

The storage unit 1302 stores at least one application, a content transmission program based on at least one piece of user cloud account information, and information to be used for content transmission. Additionally, the storage unit 1302 stores at least one program, which is configured to be possibly executed at the process 1305 that will be described later, and/or a set of commands and a resource.

The at least one program, stored in the storage unit 1302, may be at least one program which is used to execute the content transmission method according to an exemplary embodiment, an operation system program of the device 110, an application program regarding various functions executed by the device 110, and a program that runs hardware components included in the device 110.

A resource, stored in the storage unit 1302, includes information which is used to map at least one piece of user cloud account information with each unit of content, according to an exemplary embodiment. The information may include synchronization history information about the content based on at least one piece of user cloud account information, content type information, content creation or play time information, information about a location of a device during content creation or playback, information about a network location during content creation or playback, user cloud account information which is set for the device 100 by default, cloud account information which is activated during content creation or playback or information about an external device, attribute information about an application in which the content is created or played, and attribute information about user cloud account information. The information included in a resource may also be referred to as being included in a log file.

Additionally, a resource stored in the storage unit 1302 may include user information about the device 110, information used to operate an application program that is set for the device 110, and information to execute a program that is used to run the hardware components.

The storage unit 1302 may be configured to separately include a storage unit in which at least one program for running each element, such as the operation system program, included in the device 110 is stored, and a storage unit in which one or more programs to execute the content transmission method, according to an exemplary embodiment, resources, and the application programs are stored.

The storage unit 1302 may include high-speed random-access memory, a magnetic disk storage unit, a non-volatile memory such as a flash memory, or another non-volatile semiconductor memory. Accordingly, the storage unit 1302 may also be referred to as a memory. At least one program and/or a set of commands, stored in the storage unit 1302, may be classified into a plurality of modules, according to functions.

Figure 14:
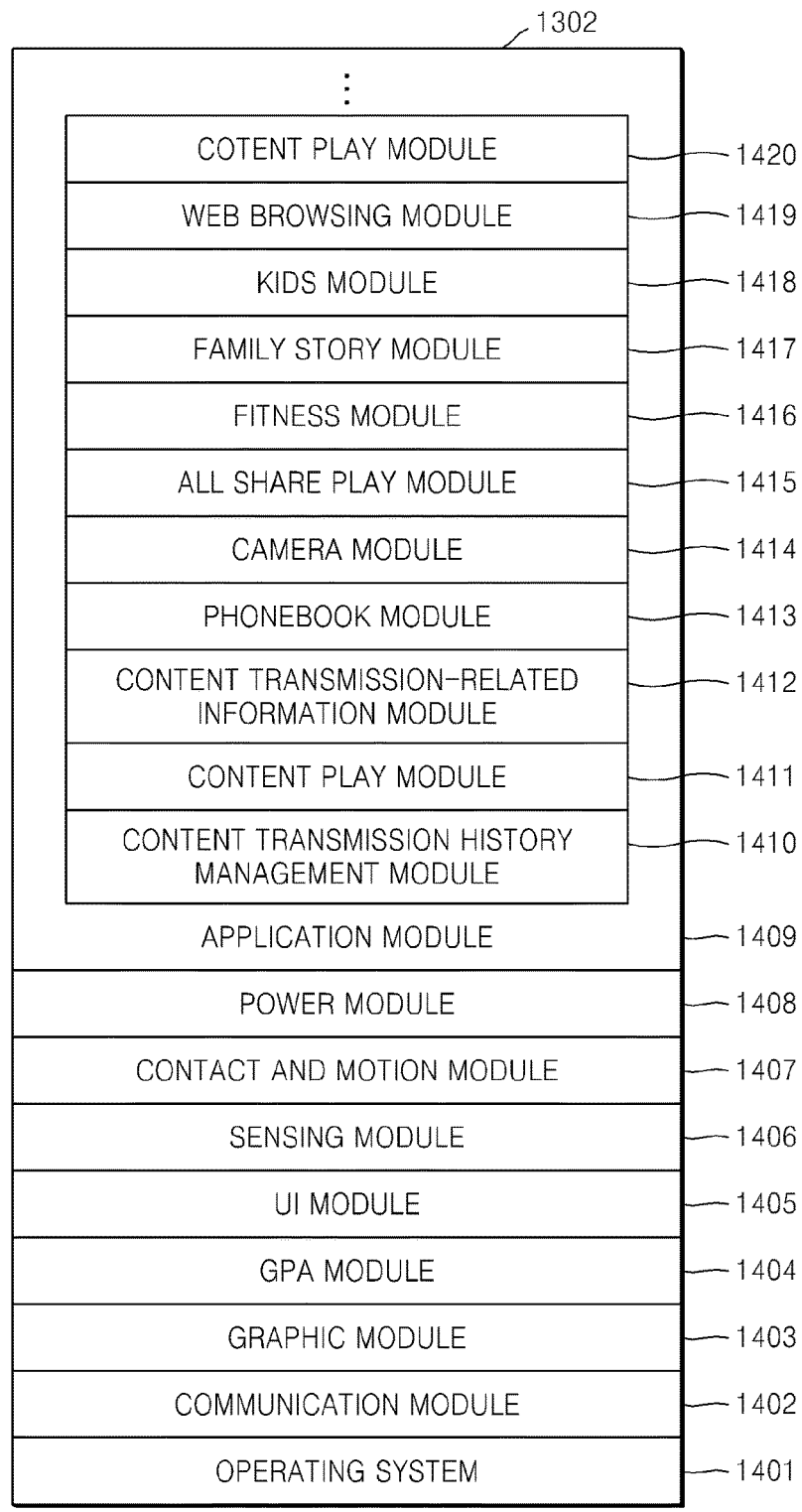
FIG. 14 is an example of a set of programs and/or commands stored in a storage unit shown in FIG. 13.

FIG. 14 is an example of programs and/or a set of commands stored in the storage unit 1302. Referring to FIG. 14, the storage unit 1302 includes an operating system 1401, a communication module 1402, a graphic module 1403, a global positioning system (GPS) module 1404, a user interface (UI) module 1405, a sensing module 1406, a contact and motion module 1407, a power module 1408, and an application module 1409. However, the storage unit 1302 is not limited thereto and may also store many other types of programs and/or sets of commands.

The application module 1409 includes a content transmission history management module 1410, a content transmission module 1411, a content transmission-related information management module 1412, a phonebook module 1413, a camera module 1414, an allshare play module 1415, a fitness module 1416, a family story module 1417, a kids module 1418, a web-browsing module 1419, and a content play module 1420. However, the application module 1409 is not limited thereto and may include modules related to many other types of applications.

The operating system 1401 controls and manages a general function of the device 100. The operating system 1401 includes a software component that allows communication between hardware and software components in the device 110.

The communication module 1402 allows communication between the 1st through nth cloud servers 130_1 through 130_n and the 1st through mth external devices 150_1 through 150_m via the communication unit 1303. The communication module 1402 includes a software component to process data received from the 1st through nth cloud servers 130_1 through 130_n and the 1st through mth external devices 150_1 through 150_m and data transmitted to the 1st through nth cloud servers 130_1 through 130_n and the 1st through mth external devices 150_1 through 150_m via the communication unit 1303. The transmitted or received data may include information for authentication and content transmission for user cloud account information.

Additionally, according to an exemplary embodiment, the communication module 1402 includes a software component. The software component allows bi-directional communication between the 1st through nth cloud servers 130_1 through 130_n and the 1st through mth external devices 150_1 through 150_m, in order to store information about mapping of at least one cloud account with content in the 1st through nth cloud servers 130_1 through 130_n and the 1st through mth external devices 150_1 through 150_m, to download an application that is stored in the 1st through nth cloud servers 130_1 through 130_n and the 1st through mth external devices 150_1 through 150_m, or to execute an application which is stored in the 1st through nth cloud servers 130_1 through 130_n and the 1st through mth external devices 150_1 through 150_m by controlling the device 110.

Additionally, according to an exemplary embodiment, when at least one application is executed at the device 110, or when content is created or displayed at the at least one application, the communication module 1402 may obtain location information about a network which is used via the communication unit 1303, and thus, provide the location information to the content transmission-related information module 1412.

The graphic module 1403 includes a software component for brightness adjustment and rendering of graphics, which are displayed on the output unit 1304, and a software component to provide a virtual keyboard or a soft keyboard to input text to the application module 1409.

The GPS module 1404 includes a software component to determine a location of the device 110, and to provide the determined location information to an application that provides a location-based service.

The UI module 1405 includes a software component to provide a user interface (UI) to the application module 1409, which provides UI information that is based on the input information receiving unit 1301 and the output unit 1304.

The sensing module 1406 includes a software component that determines sensing information based on the input information receiving unit 1301, and provides the sensing information to the application module 1409 that provides a service based on the determined sensing information.

The contact and motion module 1407 includes a software component that detects a touch contact based on information received at the input information receiving unit 1301, traces a motion based on the touch contact, and provides information related to the traced motion to the application module 1409 which uses the traced motion.

The power module 1408 includes a software component that controls a power supply to a hardware component in the device 110 by interworking with the operating system 1401, and controls a power-saving mode for power supplied to the output unit 1304.

A function of modules included in the application module 1409 may be intuitively inferred from a name of the modules by one of ordinary skill in the art. Thus, a description will focus on the application module 1409 according to an exemplary embodiment.

For example, the content transmission module 1411 starts an operation of transmitting content according to an event, such as, for example, when a content transmission menu item is selected by a user via the input information receiving unit 1301 of the device 110, when a request for executing a content transmission application is made by a user, when a content transmission period or when a content transmission time, which is stored in the storage unit 1102, is reached, or when the device 110 is in an idle state.

The content transmission module 1411 may interwork with the content transmission history management module 1410 and the content transmission-related information module 1412, and thus, as described with reference to FIG. 3, determine attribute information regarding content. Then, the content transmission module 1411 maps content with at least one piece of user cloud access information that corresponds to the determined attribute information, and transmits the content to a cloud which is determined based on the user cloud account information that is mapped with the content.

Alternatively, the content transmission module 1411 may determine attribute information about the content, as illustrated in FIG. 5, by interworking with the content transmission history management module 1410 and the content transmission-related information module 1412. Then, the content transmission module 1411 displays a list of content, mapped with at least one user piece of cloud account information which corresponds to attribute information about the determined content, Then, the content transmission module 1411 transmits the content to a cloud, determined based on user cloud account information which is mapped with the content, by using information about mapping between content, which is edited, and user cloud access information or by using information about mapping between content, which is not edited, and user cloud access information, according to user input information.

Alternatively, as illustrated in FIG. 9, the content transmission module 1411 creates and displays an integration list, and maps at least one piece of user cloud account information with each unit of content, included in an integration list, by interworking with the content transmission history management module 1410 and the content transmission-related information management module 1412. The content transmission module 1411 may be provided with location information of the device 110 during content creation or playback from the content transmission-related information management module 1410, so as to map at least one piece of user cloud account information with each unit of content. The location information is provided from the GPS module 1404 during content creation or playback.

The content transmission module 1411 may interwork with the communication module 1402, in order to store the mapping information in the 1st through nth cloud servers 130_1 through 130_n and the 1st through mth external devices 150_1 through 150_m.

The communication unit 1301 may transmit or receive data via the mapping information in the 1st through nth cloud servers 130_1 through 130_n, the 1st through mth external devices 150_1 through 150_m, and the network 120, by using a wireless network such as wireless Internet, a wireless intranet, a wireless phone network, a wireless local area network (LAN), a Wi-Fi network, a Wi-Fi direct (WFD) network, a 3rd generation (3G) network, a 4th-generation (4G) long-term evolution (LTE) network, a radio frequency identification (RFID) network, an ultra wideband (UWB) network, or a Zigbee network, or a wired network such as a wired Internet network or a home phoneline networking alliance (PNA) network.

The communication unit 1303 may include at least one module from among a broadcast receiving module, a mobile communication module, a wireless Internet module, a wired Internet module, a near-field communication (NFC) module, and a location information module. However, the communication unit 1303 is not limited thereto.

The broadcast receiving module receives information about a broadcast signal and/or broadcast-related information from an external broadcast management server (not illustrated) via a broadcast channel. The broadcast channel may be, for example, a satellite channel, a terrestrial channel, or a cable channel. A mobile communication module transmits or receives a wireless signal to or from a base station (not illustrated), the 1st through nth cloud servers 130_1 through 130_n, and the 1st through mth external devices 150_1 through 150_m on a mobile communication network. A wireless signal may include a voice call signal, a video phone call signal, or various forms of data used to transmit and receive text or multimedia messages.

According to exemplary embodiments, the wireless Internet module may be referred to a module for establishing a wireless Internet connection. Further, a wired Internet module may be referred to a module for establishing a wired Internet connection. Further, the near-field communication (NFC) module may be referred to a short distance communication module. A Bluetooth (BLE) network, an RFID network, an infrared data association (IrDA) network, a UWB network, a Zigbee network, a WFD network, or an NFC network may be employed as NFC technology.

The location information module is a module for identifying or obtaining a location of the device 110. As an example, a location information module includes a GPS-based location information module. The GPS-based location information module receives location information from a plurality of satellites. Location information may include coordinate information which is expressed as a latitude and a longitude.

The output unit 1304 outputs user interface information according to input information, and information according to the content transmission program. The output unit 1304 may include a display function and an audio signal output function. The output unit 1304 may be formed as part of the input information receiving unit 1301, or may be formed separately. The output unit 1304 may include a liquid crystal display (LCD), a thin-film transistor-liquid crystal display (TFT-LCD), an organic light-emitting diode (OLED) display, a flexible display, a 3D display, and an active-matrix organic light-emitting diode (AMOLED) display. However, the output unit 1304 is not limited thereto. Two or more of the output units 1104 may be included, according to an implementation type of the device 110.

The processor 1305 controls all operations of the device 110. The processor 1305 may be referred to as one or more processors. In FIG. 13, the processor 1305 is illustrated in the form of a single chip. However, according to a function of the device 110, the processor 1305 may be implemented as a plurality of processors.

The processor 1305 may control the input information receiving unit 1301, the storage unit 1302, the communication unit 1303, and the output unit 1304, by using the operating system 1401 and various modules 1402 through 1420. Accordingly, the processor 1305 may be referred to as a controller, a microprocessor, or a digital signal processor (DSP). Additionally, the processor 1305 may provide a UI by using the input information receiving unit 1301 and the output unit 1304, by using the operating system 1401 and the UI module 1405.

Figure 18:
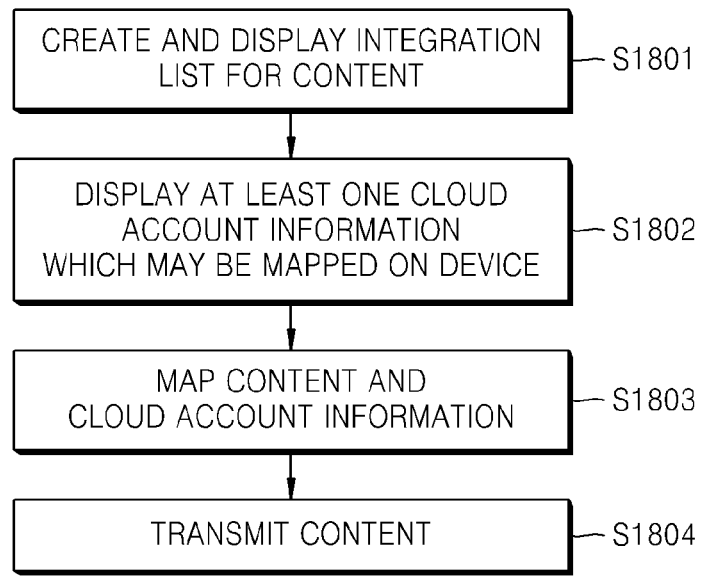
FIG. 18 is a flowchart illustrating an operation of the device according to the content transmission method according to another exemplary embodiment.
Figure 19:
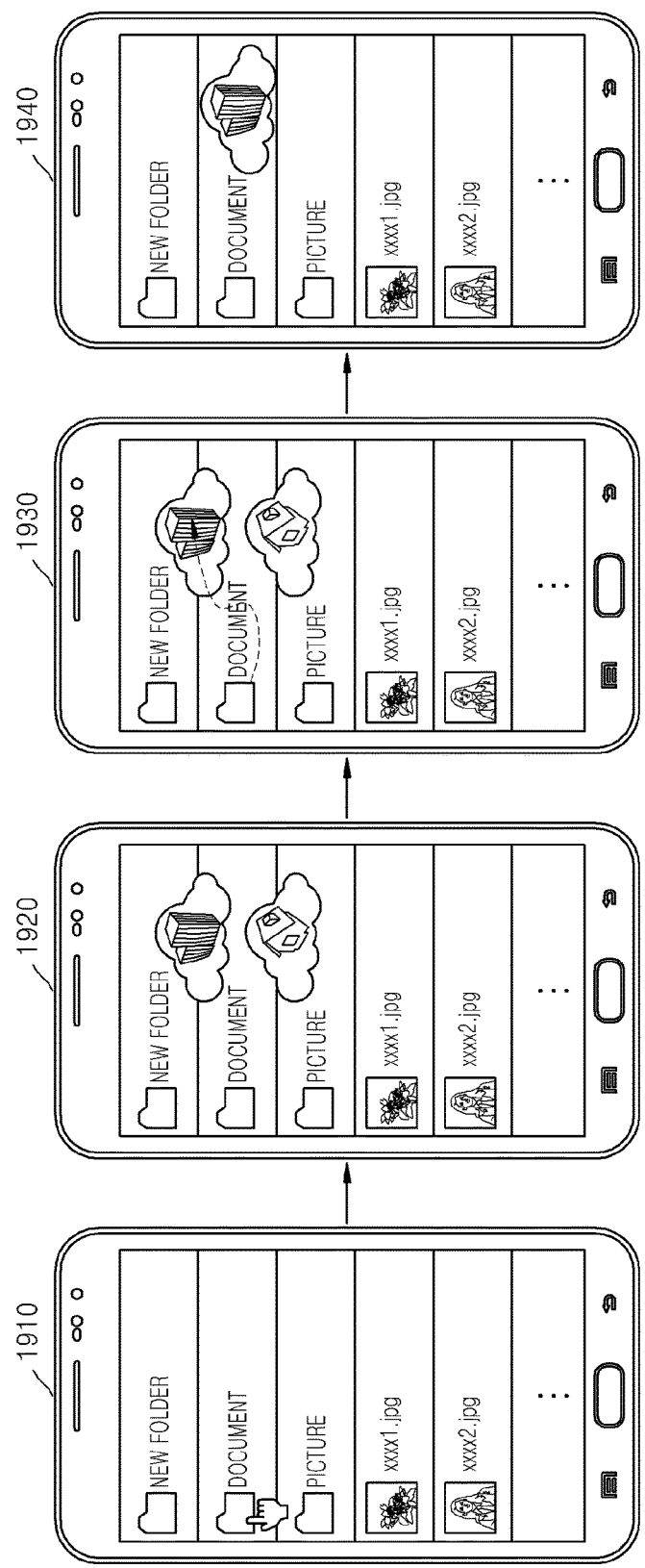
FIG. 19 is an example of a screen displayed based on the operation flowchart of FIG. 18.

The processor 1305 may execute one of the flowcharts of the device 110, shown in FIGS. 3, 5, and 9, or one of the flowcharts, shown in FIGS. 18 and 19, by executing at least one program with regard to the content transmission method, according to an exemplary embodiment. The processor 1305 reads and executes the program from the storage unit 1302, or downloads the program from a server (e.g., World Wide Web server), which is connected to the processor 1305 via the communication unit 1303, or the 1st through nth cloud servers 130_1 through 130_n.

The processor 1305 may execute at least one program stored in the 1st through nth cloud servers 130_1 through 130_n and the storages 151_1 through 151_m, with regard to the content transmission method according to an exemplary embodiment. Then, the processor 1305 may transmit content to at least one of the 1st through nth cloud servers 130_1 through 130_n and the storages 151_1 through 151_m.

According to exemplary embodiments, the processor 1305 includes an interface function unit to interface between various hardware components and the processor 1305.

Figure 15:
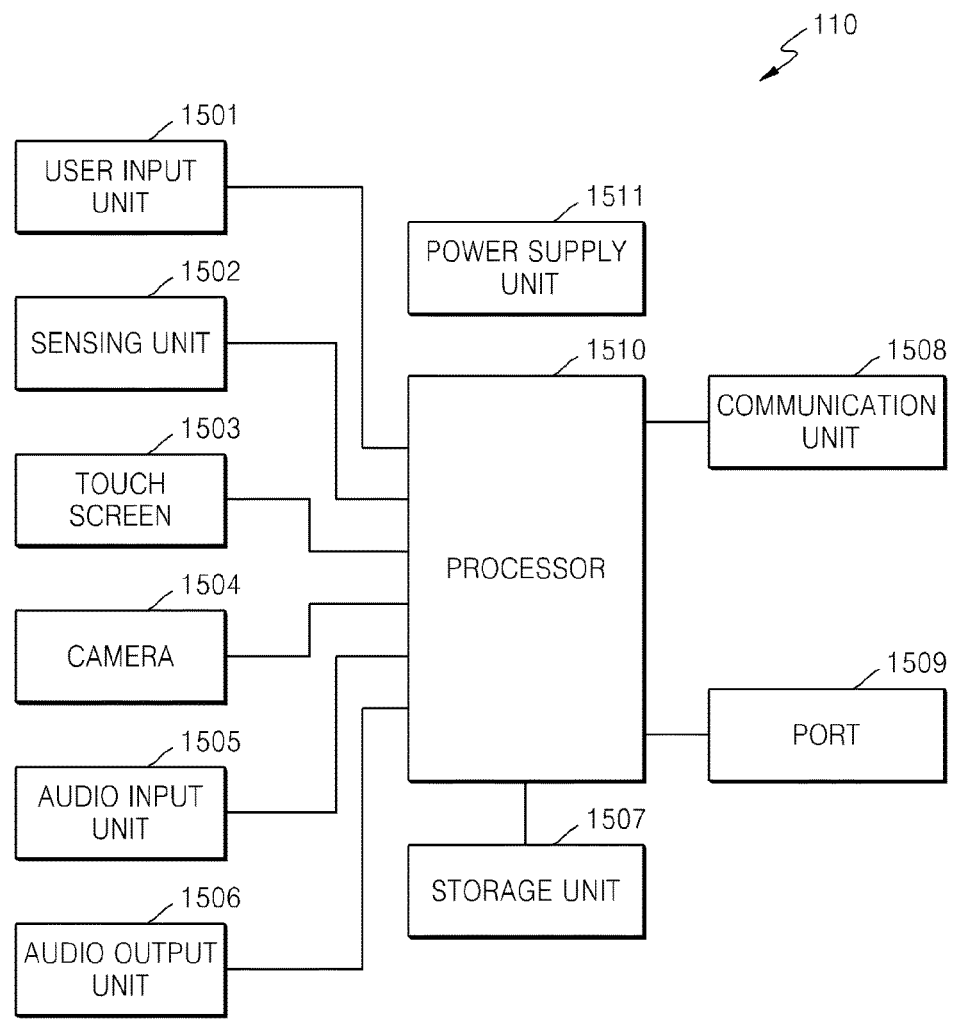
FIG. 15 is another example of a functional block diagram of the device shown in FIG. 1.

FIG. 15 is another example of a functional block diagram of the device 110 of FIG. 1. Referring to FIG. 15, the device 110 includes a user input unit 1501, a sensing unit 1502, a touch screen 1503, a camera 1504, an audio input unit 1505, an audio output unit 1506, a storage unit 1507, a communication unit 1508, a port 1509, a processor 1510, and a power unit 1511. However, the configuration of the device 110 is not limited to the configuration illustrated in FIG. 15.

The user input unit 1501 generates input data, control data, and information input by the user. The user input unit 1501 may include a key pad, a dome switch, a touch pad that may be used instead of or in combination with a mouse, a jog wheel, a jog switch, or a hardware (H/W) button.

The sensing unit 1502 generates a sensing signal to control an operation of the device 110 by detecting a current status of the device 110, such as a location of the device 110, contact by a user, a direction of the device 110, and acceleration or deceleration of the device 110. The sensing unit 1502 may include a proximity sensor and a motion sensor. Accordingly, the sensing unit 1502 may generate a signal which recognizes a gesture by a user based on a sensor.

The proximity sensor is a sensor to detect an object which is approaching a predetermined detection surface or a neighboring object, by using various techniques, such as techniques based on the strength of an electromagnetic field or infrared light without a mechanical contact. Examples of the proximity sensor include a transmission-type photoelectric sensor, a direct reflection-type photoelectric sensor, a mirror reflection-type photoelectric sensor, a high-frequency oscillation proximity sensor, an electrostatic capacity-type proximity sensor, a magnetic-type proximity sensor, and an infrared proximity sensor.

User input information based on the touch screen 1503 may be generated according to a request or selection by a user according to the gesture by the user. A gesture by a user may be defined in many different exemplary ways, for example, as the examples of a gesture described above, and may further be based on the number of touches, a pattern of a touch, a size of a touch, the strength of a touch, and a combination thereof.

Additionally, the touch screen 1503 may include various types of sensors to detect a touch or a proximity touch on the touch screen 1503. A sensor, included in the touch screen 1503, may be implemented as a sensor that detects a gesture by a user or a pattern on the touch screen 1503. Accordingly, the touch screen 1503 may generate a signal that senses a drag, a flick, a tap, a touch and hold, a double-tap, panning, and a swipe, based on the touch. A proximity sensor of the touch screen 1503 may be the same as the proximity sensor included in the sensing unit 1502.

An example of a sensor to detect a touch on the touch screen 1503 may be a tactile sensor. The tactile sensor may detect various types of information, such as a roughness of a contact surface, a hardness of a contact object, or a temperature at a contact point. A touch on the touch screen 1503 may be a touch by which a pointer touches a panel. A proximity touch on the touch screen 1503 may be a touch by which a pointer does not actually touch the screen 1503, but approaches the screen 1503 from a predetermined distance away. A pointer is a tool for touching or proximately touching a particular portion of the screen 1503. An example of the pointer may be a stylus pen, a finger or a physical area of a person that corresponds to a finger, or a tool that corresponds to a finger. A pointer may also be referred to as an external input device.

The touch screen 1503 outputs information which is processed by the device 110. For example, the touch screen 1503 displays a screen that responds to a gesture or a touch pattern input by a user, which is sensed through the sensing unit 1502 included in the touch screen 1503, control data of user input information, which is input via the user input unit 1501, or a signal, which is detected via the sensing unit 1502.

The touch screen 1503 may also be referred to as an input and output device. If the touch screen 1503 is implemented as an input and output device, a screen displayed on the touch screen 1503 may include a UI or a graphical user interface (GUI) screen. The touch screen 1503 may display a screen, as shown in FIGS. 10A through 10E, FIGS. 11A through 11D, FIG. 12, and FIG. 19, as described later, and may receive user input information.

The touch screen 1503 may be implemented as an LCD, a TFT-LCD, an OLED display, a flexible display, a 3D display, and an AMOLED display, but it is not limited thereto. The touch screen 1503 may also be referred to as a display. Two or more of the touch screens 1503 may be included according to an implementation type of the device 110.

The camera 1504 processes an image frame of a still or moving image that is obtained by using an image sensor or an optical sensor in a video phone call mode or a photographing mode. The processed image frame may be displayed on the touch screen 1503. The image frame, processed by the camera 1504, may be stored in the storage unit 1507 or transmitted to the outside via the communication unit 1508 or the port 1509.

Two or more of the cameras 1504 may be included according to a configuration of the device 110. Additionally, the camera 1504 may be used as an input device to recognize a space gesture of a user. The image frame, obtained from the camera 1504, may be a face image to obtain authentication of a user of the device 110.

The audio input unit 1505 receives an external sound signal in a phone call mode, a recording mode, or a voice recognition mode. Then, the audio input unit 1505 converts the external sound signal into electrical voice data, and transmits the electrical voice data to the processor 1510. The audio input unit 1505 may be configured to include, for example, a microphone. The audio input unit 1505 may be configured to include various noise removal algorithms to remove noise that may be generated in a process of receiving an external sound signal.

The sound signal, input by using the audio input unit 1505, may be user input information based on a natural language. For example, a command to request mapping between content and user cloud account information may be input via the audio input unit 1505. The sound signal, which may be user input information based on a natural language, may be user input information based on voice recognition. An external voice signal, input via the audio input unit 1505, may be stored in the storage unit 1507, or transmitted to the communication unit 1508 or the port 1509.

According to a function of interfacing between the device 110 and a user, combinations of the user input unit 1501, the sensing unit 1502, the touch screen 1503, the camera 1504, and the audio input unit 1505 may collectively be referred to as an information input unit or an information input and output unit. For example, if the function of interfacing between the device 110 and a user includes touch recognition, voice recognition, and space gesture recognition, the user input unit 1501, the sensing unit 1502, the camera 1504, and the audio input unit 1505 may be referred to as an information input unit, and the touch screen 1503 may be referred to as an information input and output unit.

The audio output unit 1506 outputs a sound signal or an audio signal that is received from the outside, in a phone call mode or in an audio play mode. The audio output unit 1506 may be implemented as a speaker. If an audio signal is generated when an application is executed, the audio output unit 1506 outputs the generated audio signal. The audio output unit 1506 and the audio input unit 1505 may be formed as one body, such as a headset.

The communication unit 1508 may transmit or receive data to or from the 1st through nth cloud servers 130_1 through 130_n and the 1st through mth external devices 150_1 through 150_m, via a wireless network such as wireless Internet, a wireless intranet, a wireless phone network, a wireless LAN, a Wi-Fi network, a WFD network, a 3G network, a 4G LTE network, a Bluetooth network, an IrDA network, an RFID network, a UWB network, or a Zigbee network, or a wired network such as a wired Internet network or a home PNA network. The wireless network may be implemented in accordance with a machine-to-machine (M2M) concept.

The communication unit 1508 may include at least one module from among a broadcast receiving module, a mobile communication module, a wireless Internet module, a wired Internet module, an NFC module, and a location information module. However, the communication unit 1508 is not limited thereto.

The port 1509 may transmit or receive data to or from the outside, by using a plug-and-play interface such as a universal serial bus (USB) port (not illustrated). The plug-and-play interface is a module to automatically play an external device (not illustrated) when the external device is connected to the device 110. The external device, which is not illustrated, may include the 1st through mth external devices 150_1 through 150_m, shown in FIG. 1.

The power supply unit 1511 supplies power to a hardware component included in the device 110. The power supply unit 1511 includes one or more power sources such as a battery or an alternating current (AC) power supply. The device 110 may include a connection unit (not illustrated) which may be connected to an external power supply unit (not illustrated), instead of the power supply unit 1511.

The processor 1510 controls all operations of the device 110. The processor 1510 may be implemented as one or more processors. In FIG. 15, the processor 1510 is illustrated in the form of a single chip. However, according to a function of the device 110, the processor 1510 may be formed of and operated as a plurality of processors.

The processor 1510 may control the user input unit 1501, the sensing unit 1502, the touch screen 1503, the camera 1504, the audio input unit 1505, the audio output unit 1506, the storage unit 1507, the communication unit 1508, the port 1509, and the power unit 1511. The operating system and various modules may correspond to the operating system 1401 and various modules 1402 through 1420 shown in FIG. 14. The processor 1510 may be referred to as a controller, a microprocessor, or a DSP. Additionally, the processor 1510 may provide a UI by using the input information receiving unit 1501, the sensing unit 1502, the touch screen 1503, the camera 1504, and the audio input unit 1505.

The processor 1510 may execute one of the flowcharts, shown in FIGS. 2, 5, and 9, or shown in FIGS. 17 and 18 that will be described later, by executing at least one program with regard to the content transmission method, according to an exemplary embodiment. The processor 1510 reads and executes the program to execute the content transmission method from the storage unit 1507, or downloads the program from at least one among a server (not illustrated), the 1st through nth cloud servers 130_1 through 130_n, and the 1st through mth external devices 150_1 through 150_m, which is connected to the processor 1510 via the communication unit 1508.

The processor 1510 may execute at least one program stored in the 1st through nth cloud servers 130_1 through 130_n and the 1st through mth external devices 150_1 through 150_m, with regard to the content transmission method according to an exemplary embodiment. Then, the processor 1305 may map at least one piece of user cloud account information with each unit of content, and transmit the content to at least one of the 1st through nth cloud servers 130_1 through 130_n and the 1st through nth external devices 150_1 through 150_m. The processor 1510 may include an interface function unit to interface between various hardware components and the processor 1510 in the device 110.

Figure 16:
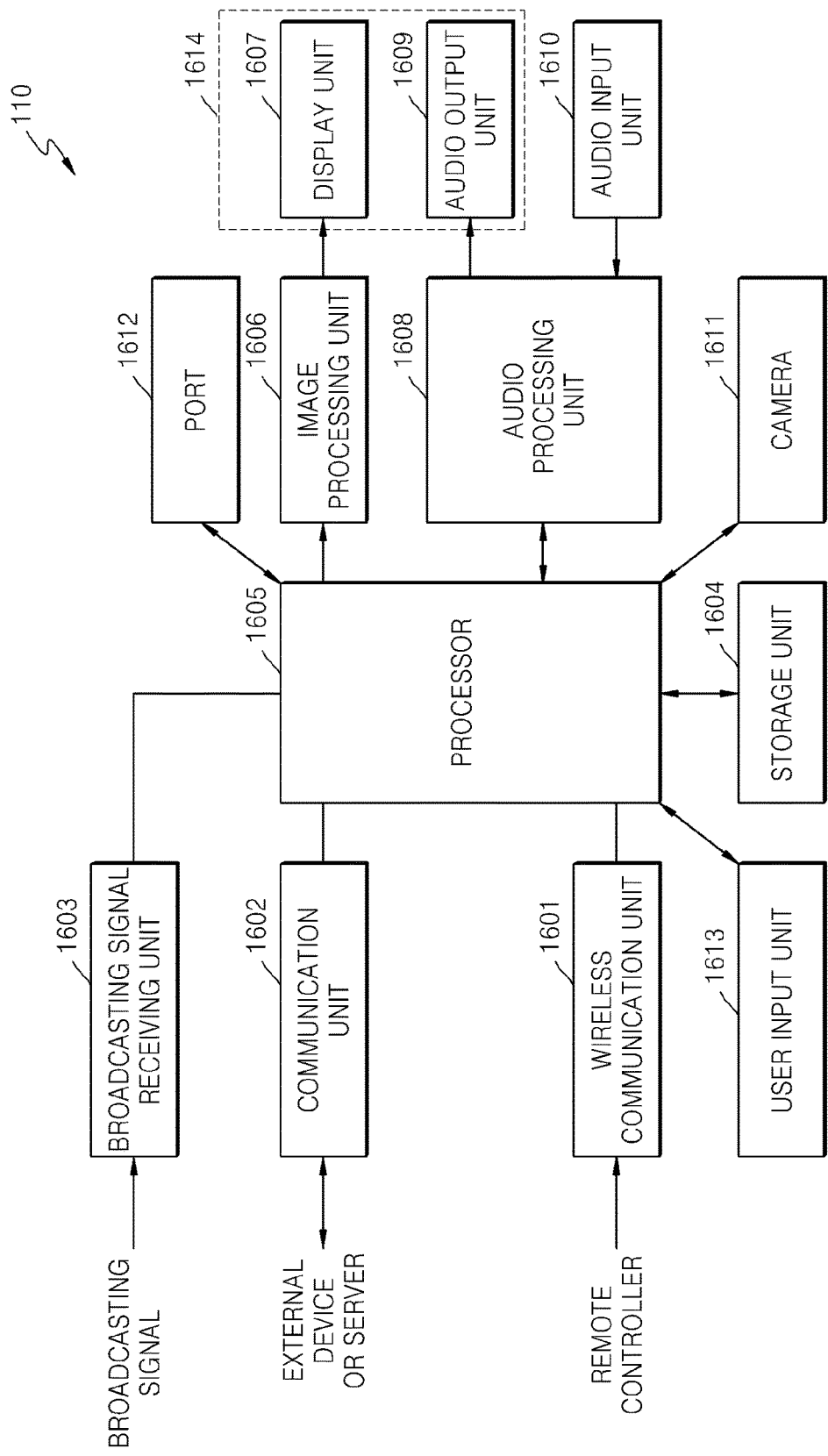
FIG. 16 is an example of a functional block diagram of the device shown in FIG. 1.

FIG. 16 is an another example of a functional block diagram of the device 110 of FIG. 1. FIG. 16 shows a smart TV, which has a communication function, as an example.

Referring to FIG. 16, the device 110 includes a wireless communication unit 1601, a communication unit 1602, a broadcast signal receiving unit 1603, a storage unit 1604, a processor 1605, an image processing unit 1606, a display unit 1607, an audio processing unit 1608, an audio output unit 1609, an audio input unit 1610, a camera 1611, a port 1612, and a user input unit 1613. However, a configuration of the device 110 is not limited thereto.

The wireless communication unit 1601 is configured to wirelessly communicate with a remote controller (not illustrated). That is, if the remote controller includes, for example, an infrared (IR) transmitter, the wireless communication unit 1601 is formed to include a corresponding IR receiver. Thus, the wireless communication unit 1601 receives an IR signal which is transmitted from the remote controller, and then decodes and transmits the IR signal to the processor 1605. Alternatively, if the remote controller is formed as a radio frequency (RF) module, the wireless communication unit 1601 may be formed to include a corresponding RF module. Thus, the wireless communication unit 1601 receives an RF signal which is transmitted from the remote controller, and then transmits the IR signal to the processor 1605. However, the wireless communication unit 1601 is not limited to include the IR or RF module. For example, the wireless communication unit 1601 may be configured to be based on NFC communication such as Bluetooth. The wireless communication unit 1601 may be referred to as an input information receiving unit that receives user input information.

According to an exemplary embodiment, the communication unit 1602 may be connected to the device 110 via a wired or wireless network, as described with respect to the communication unit 1508 shown in FIG. 15, and thus transmits and receives data. Alternatively, the communication unit 1602 may be connected to the 1st through nth cloud servers 130_1 through 130_n and the 1st through mth external devices 150_1 through 150_m, and thus transmits and receives data.

The broadcast signal receiving unit 1603 separates a broadcast signal, which is received via a tuner (not illustrated), into an image signal and an audio signal, and outputs the separated broadcast signal. That is, the tuner selects a broadcast signal, which corresponds to a channel which is selected by a user or pre-stored, from among broadcast signals received via an antenna. Additionally, the broadcast signal receiving unit 1603 converts the selected broadcast signal into an intermediate frequency signal, a base band image, or an audio signal. The intermediate frequency signal, the base band image, or the audio signal is input to the processor 1605.

The storage unit 1604 may store at least one program to process and control various signals by the processor 1605, and store information to authenticate the device 110, and information about the device 110. The information to authenticate the device 110 may include user information of the device 110. The at least one program to process and control various signals by the processor 1605 may be a program for creating, or creating and displaying, an integration list, as in one of the flowcharts, shown in FIGS. 3, 5, and 9, or shown in FIGS. 17 and 18 that will be described later, mapping each unit of content included in the integration list with at least one piece of user cloud account information and transmitting the content to at least one cloud that is determined based on mapping information. Additionally, the storage unit 1604 may include at least one program that may store the mapping information in at least one of the 1st through nth cloud servers 130_1 through 130_n and the 1st through mth external devices 151_1 through 151_m.

The processor 1605 may control all operations of the device 110, and control the communication unit 1602 to transmit or receive data to or from the 1st through nth cloud servers 130_1 through 130_n and the 1st through mth external devices 151_1 through 151_m via the communication unit 1602. The processor 1605 may load at least one program stored in the storage unit 1604, configure a UI screen according to an exemplary embodiment, and display the UI screen on the display unit 1607 via the image processing unit 1606. The UI screen includes, for example, the UI screen shown in FIGS. 10A through 10E, FIGS. 11A through 11D, and FIGS. 12 and 19.

The processor 1605 may transmit or receive data to or from the 1st through nth cloud servers 130_1 through 130_n and the 1st through mth external devices 150_1 through 150_m that are connected via the communication unit 1602. To achieve this, the processor 1605 may use at least one program and resource which are stored in the storage unit 1604. The processor 1605 may be formed of at least one processor, similar to the processor 1510 shown in FIG. 15.

The image processing unit 1606 includes an image decoder (not illustrated) and a scaler (not illustrated). The image processing unit 1606 processes an image signal, which is output from the broadcast signal receiving unit 1603, so as to display the image signal on a screen. The image decoder decodes an inverse-multiplexed image signal, and the scaler executes scaling so as to output the decoded image signal having an appropriate resolution to the display unit 1607. The image decoder may use one of image decoders of various standard. For example, if the inverse-multiplexed image signal is an encoded image signal according to the moving picture experts group (MPEG)-2 standard, the inverse-multiplexed image signal may be decoded by an MPEG-2 decoder. For example, if the inverse-multiplexed image signal is an encoded image signal according to a digital multimedia broadcasting (DMB) method or the H.264 standard by using a digital video broadcasting-handheld (DVB-H), the image signal may be decoded by an H.264 decoder. Other types of image decoders may also be used.

The display unit 1607 may output an image that is processed by the image processing unit 1606. The output image may include an image received from the broadcast signal receiving unit 1603, a UI screen, and an image obtained by executing an application that is received from the 1st through nth cloud servers 130_1 through 130_n and the 1st through mth external devices 150_1 through 150_m via the communication unit 1602. Also, the display unit 1607 may be formed as a touch screen, and thus, be used as an input device.

The audio processing unit 1608 processes an audio signal, output from the broadcast signal receiving unit 1603, and an audio signal, included in content that is received via the communication unit 1602, and outputs the audio signal to the audio output unit 1609. The audio output unit 1609 may be implemented in various forms to output various types of audio signals, for example, a stereo signal, a 3.1 channel signal, or a 5.1 channel signal.

Additionally, the audio processing unit 1608 may process a signal, input from the audio input unit 1610, and transmit the signal to the processor 1605. The audio input unit 1610 may be formed as a microphone. The display unit 1607 and the voice output unit 1609 may be defined as an output unit 1614 to output user interface information according to information that is input via the wireless communication unit 1601 or the user input unit 1613, and information obtained by executing an application.

The camera 1611, the port 1612, and the user input unit 1613 may operate similarly to the user input unit 1601, the camera 1604, and the port 1609 shown in FIG. 16. Thus, a repeated description thereof is not provided.

According to an exemplary embodiment, the storage unit 1302 shown in FIG. 13, the storage unit 1507 shown in FIG. 15, and the storage unit 1604 shown in FIG. 16 may not store modules that are included in the application module 1409, from among the programs and/or the set of commands shown in FIG. 14. Otherwise, the storage unit 1302 shown in FIG. 13, the storage unit 1507 shown in FIG. 15, and the storage unit 1604 shown in FIG. 16 may store only display information, such as a uniform resource locator (URL) of the application module 1409, and display information that may represent the application module 1409. If a module included in the application module 1409 is not stored in the storage units 1302, 1507, and 1604, the processors 1305, 1510, and 1605 may be connected to at least one of the 1st through nth cloud servers 130_1 through 130_n and the 1st through mth external devices 150_1 through 150_m via the communications units 1303, 1508, and 1602 and use a program and/or a set of commands that corresponds to the application module 1409 which is stored in the 1st through nth cloud servers 130_1 through 130_n and the 1st through mth external devices 150_1 through 150_m.

Figure 17:
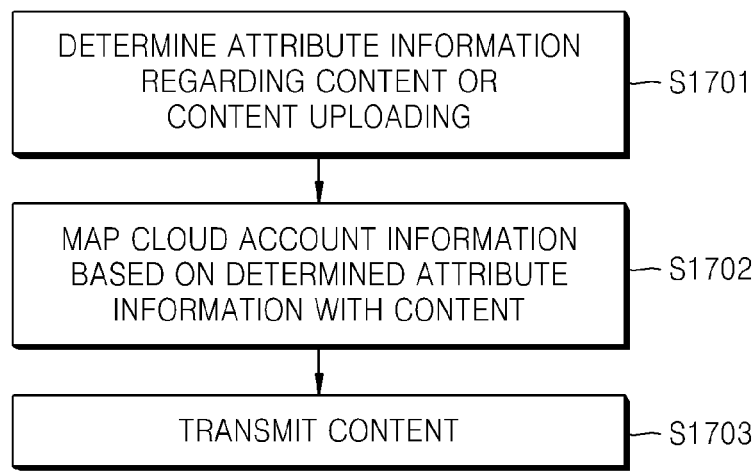
FIG. 17 is a flowchart illustrating an operation of the device according to the content transmission method according to an exemplary embodiment.

FIG. 17 is an operation flowchart of the device 110 using the content transmission method according to an exemplary embodiment. The content transmission method may be executed by the processors 1305, 1510, and 1605 by using at least one program and resource which are stored in the storage unit 1302, 1507, and 1604. Hereinafter, for convenience of description, the method is described as being performed by the processor 1305.

In operation S1701, by using the process which is described with reference to FIG. 13, the processor 1305 of the device 110 determines attribute information regarding content or uploading, so as to upload the content. In operation S1702, if the attribute information regarding the content or the uploading is determined, the processor 1305 maps at least one piece of user cloud account information, which corresponds to the determined attribute information, with the content. In operation S1703, the processor 1305 transmits the content to the cloud that is determined based on the mapped user cloud account information.

FIG. 18 is an operation flowchart of the device 110 using a content transmission method, according to another exemplary embodiment. The operation flowchart, shown in FIG. 18, corresponds to the operation flowchart which is based on the content transmission system 100, shown in FIG. 9. Accordingly, FIG. 18 shows a process of respectively displaying user cloud account information which may be mapped with an integration list, mapping the content with the user cloud account information by user input information, and transmitting the content to a cloud. The content transmission method shown in FIG. 18 may be executed by the processors 1305, 1510, and 1605. Hereinafter, for convenience of description, the method is described as being performed by the processor 1305.

Referring to FIG. 18, as described in operation S901 shown in FIG. 9, in operation S1801, the processor 1305 creates an integration list for content, and displays the integration list on the output unit 1304. FIG. 19 shows an example of a screen which is displayed on the output unit 1304 according to the operation flowchart shown in FIG. 18. Accordingly, a screen 1910, shown in FIG. 19, is a screen of an integration list that is displayed in operation S1801.

In operation S1802, if a signal for selecting one unit of content, for example, the unit of content labeled 'document' in the screen 1910 shown in FIG. 19 from among contents included in an integration list which is displayed on the output unit 1304, is received from a user via the input information receiving unit 1301, the processor 1305 displays at least one piece of user cloud account information which may be mapped with the selected content to the output unit 1304, such as, for example, on a screen 1920 shown in FIG. 19. The screen 1920, shown in FIG. 19, is an example of displaying office user cloud account information and home user cloud account information in the form of respective images.

In operation S1803, when at least one piece of user cloud account information which may be mapped with the selected content is displayed, if user input information, which maps the selected content with at least one piece of user cloud account information that is represented by an account image (e.g., for an office, as shown in FIG. 19), is received, as illustrated in a screen 1930 shown in FIG. 19, the processor 1305 maps the selected content with the selected at least one piece of user cloud account information. Accordingly, an integration list, displayed on the output unit 1304, is changed, as shown in a screen 1940 illustrated in FIG. 19.

In operation S1804, the processor 1305 transmits the content to the cloud which is determined based on the user cloud account information, mapped to the content by the device 110.

According to another exemplary embodiment, the processor 1305 displays a list of content for each piece of user cloud account information on the output unit 1304 as illustrated in FIG. 6. Then, when a user input signal to control a "transmit now" button is received, the processor 1305 may operate to transmit the content to a cloud which is determined based on user cloud account information, which is mapped to the content. The transmitting of the content may be executed based on an order of the user cloud account information, which is displayed on the output unit 1304, regardless of reception of user input information via the input information receiving unit 1301.

Figure 20:
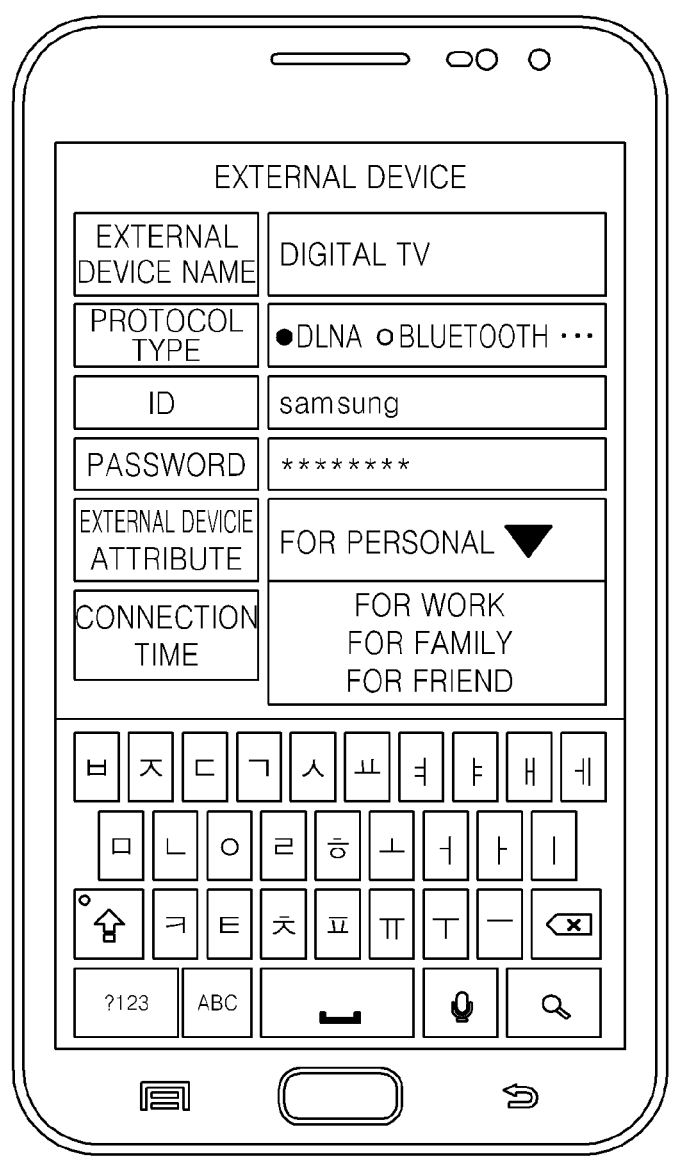
FIG. 20 is an example of a screen for registering an external device according to an exemplary embodiment.

FIG. 20 is an example of a screen which is used, to register information about at least one external device, from among the 1st through mth external devices 150_1 through 150_m, on the device 110 when the user cloud account information, in the exemplary embodiments described above, is information about an external device. As described above, the information about the external device is used to be mapped with attribute information about the content, like user cloud account information, and transmit the content. For example, the information about the external device includes a product name, that is, a name of the external device, information about a protocol type of communication between the external device and the device 110, an ID of a user, a password of the user, an attribute of the external device, and visual information connected to the device 110. An input window for the user ID may be displayed so that ID information about the user may be input according to the protocol type. That is, if a communication protocol between the device 110 and the external device is set to a digital living network alliance (DLNA), shown in FIG. 20, the input window for the user ID may be displayed so that information may be input. Alternatively, if a communication protocol between the device 110 and the external device is set to a Bluetooth network, as shown in FIG. 20, the input window for the user ID may be displayed so that information may not be input. However, a screen for registering information about the external device is not limited to the example illustrated in FIG. 20.

The device 110 may map information about at least one external device with the content by using the information about the external device, which is registered based on the screen shown in FIG. 20, and transmit the content to a cloud that is determined based on the mapped information about at least one external device.

The input information receiving unit 1301 of FIG. 13 may be referred to as an input information receiver or an input information interface. The storage unit 1302 of FIG. 13 may be referred to as a storage. The communication unit 1303 of FIG. 13 may be referred to as a communication device, a communication interface, or a communication processor. The output unit 1304 of FIG. 13 may be referred to as an output device or an output interface.

The user input unit 1501 of FIG. 15 may be referred to as a user input interface or a user input device. The sensing unit 1502 of FIG. 15 may be referred to as a sensor. The audio input unit 1505 of FIG. 15 may be referred to as an audio input interface or an audio input device. The audio output unit 1506 of FIG. 15 may be referred to as an audio output interface or an audio output device. The storage unit 1507 of FIG. 15 may be referred to as a storage. The communication unit 1508 of FIG. 15 may be referred to as a communication device, a communication interface, or a communication processor. The power supply unit 1511 of FIG. 15 may be referred to as a power supply.

The wireless communication unit 1601 of FIG. 16 may be referred to as a wireless communication device, a wireless communication interface, or a wireless communication processor. The communication unit 1602 of FIG. 16 may be referred to as a communication device, a communication interface, or a communication processor. The broadcasting signal receiving unit 1603 of FIG. 16 may be referred to as a broadcasting signal receiver. The storage unit 1604 of FIG. 16 may be referred to as a storage. The display unit 1607 of FIG. 16 may be referred to as a display. The audio input unit 1610 of FIG. 16 may be referred to as an audio input interface or an audio input device. The audio output unit 1609 of FIG. 16 may be referred to as an audio output interface or an audio output device. The user input unit 1613 of FIG. 16 may be referred to as a user input interface or a user input device.

The sensing unit 1502 of FIG. 15 may be referred to as a sensor. The communication unit 1508 of FIG. 15 may be referred to as a communication device, a communication interface, or a communication processor. The power supply unit 1511 of FIG. 15 may be referred to as a power supply.

One or more programs which include commands to execute a method of implementing the content transmission method by using a computer, according to the exemplary embodiments, can be recorded as computer-readable code on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion.

While the disclosure has been particularly shown and described with reference to exemplary embodiments thereof, it will be understood by those skilled in the art that various changes in form and details may be made therein without departing from the spirit and scope of the exemplary embodiments as defined by the appended claims. The exemplary embodiments should be considered in a descriptive sense only and not for purposes of limitation. Therefore, the scope of the disclosure is defined not by the detailed description of the exemplary embodiments but by the appended claims, and all differences within the scope will be construed as being included in the present disclosure.

What is claimed is:

1. A content transmission method to be performed by a device, the method comprising:
    detecting, by a processor of the device, attribute information regarding content;
    mapping, by the processor, at least one piece of user cloud account information with the content based on the detected attribute information regarding the content and attribute information regarding the at least one piece of user cloud account information;
    displaying, on a display of the device, a result of the mapping the at least one piece of user cloud account information with the content, wherein the displaying of the result of the mapping comprises displaying a content list which comprises information for indicating attribute information regarding the at least one piece of user cloud account information that is mapped with the content;
    in response to receiving, via a user interface of the device, a user input of selecting attribute information regarding the at least one piece of user cloud account information based on the information for indicating attribute information regarding the at least one piece of user cloud account information that is mapped with the content, changing, by a processor, the result of the mapping of the at least one piece of user cloud account information with the content according to the selected attribute information;

determining, by the processor, an external device based on the changed result of the mapping; and transmitting, via a communicator of the device, the content to the determined external device, wherein the external device includes a cloud service based server.

2. The method of claim 1, wherein the attribute information regarding the content comprises at least one of:

synchronization history information about the content based on at least one piece of user cloud account information, information about a type of the content, time information about creation or playback of the content, information about a location of the device during creation or playback of the content, information about a network location during content creation or playback of the content, user cloud account information activated during creation or playback of the content, and information about an application by which the content is created or played; and wherein the attribute information regarding the at least one piece of user cloud account information comprises at least one of information indicating a purpose of a user cloud account information and a keyword input by a user of the device.

3. The method of claim 1, wherein the detecting of the attribute information is performed by using at least one of metadata of the content and log information about the device when the content is created or played.

4. The method of claim 1, wherein the method is executed according to one of a request for content transmission by a user, a request for execution of a content transmission application by the user, a content transmission period which is set by the user, a content transmission time which is set by the user, and an idle state of the device.

5. The method of claim 1, wherein the displaying of the result of the mapping the at least one piece of user cloud account information with the content comprises:

displaying a list related to the content which is mapped with the at least one piece of user cloud account information based on the attribute information regarding the at least one piece of user cloud account information, wherein the transmitting of the content to the determined external device is performed by controlling a transmission request item, which is displayed with the list related to the content.

6. The method of claim 1, wherein the information for indicating attribute information comprises at least one check box.

7. The method of claim 1, wherein the changing of the result of the mapping comprises:

displaying a drop list which comprises attribute information regarding at least one other piece of user cloud account information in response to receiving a user input based on the attribute information regarding the at least one piece of user cloud account information; and changing the at least one piece of user cloud account information that is mapped with the content into the at least one other piece of user cloud account information in response to receiving a user input based on the attribute information included in the drop list.

8. The method of claim 1, wherein the transmitting of the content comprises storing metadata related to the content in the device and deleting the content from the device after the transmitting of the content.

9. The method of claim 1, wherein the transmitting of the content comprises authenticating the user cloud account information mapped with the content.

10. A device comprising:

a communication interface configured to communicate with at least one external device;

an input interface configured to receive user input;

a display configured to output user interface information according to the user input; and a processor configured to:

detect attribute information regarding content, map at least one piece of user cloud account information with the content based on the detected attribute information regarding the content and attribute information regarding the at least one piece of user cloud account information, display, on the display, a result of the mapping the at least one piece of user cloud account information with the content, wherein the displayed result of the mapping comprises information for indicating attribute information regarding the at least one piece of user cloud account information that is mapped with the content, in response to receiving a user input of selecting attribute information regarding the at least one piece of user cloud account information that is mapped with the content, change the result of the mapping of the at least one piece of user cloud account information with the content according to the selected attribute information, determine an external device among the at least one external device based on the changed result of the mapping, and transmit the content to the determined external device via the communication interface, wherein the external device includes a cloud service based server.

11. The device of claim 10, wherein the attribute information regarding the content comprises at least one of synchronization history information about the content, information about a type of the content, time information about creation or playback of the content, information about a location of the device during creation or playback of the content, information about a network location during content creation or playback of the content, user cloud account information activated during creation or playback of the content, and information about an application by which the content is created or played, and wherein the attribute information regarding the at least one piece of user cloud account information comprises at least one of information indicating a purpose of a user cloud account information, and a keyword input by a user of the device.

12. The device of claim 10, wherein the processor is configured to execute a content transmission program according to one of a request for content transmission by a user, a request for execution of a content transmission application by the user, a content transmission period which is set by the user, a content transmission time which is set by the user, and an idle state of the device.

13. The device of claim 10, wherein, based on the attribute information regarding the at least one piece of user cloud account information, the processor is configured to display a list related to the content which is mapped with the at least one piece of user cloud account information, and, when a control of a transmission request item displayed with the list related to the content is received via the input interface, transmit the content to the determined external device via the communication interface.

14. The device of claim 10, wherein the processor is configured to perform authentication related to the at least one piece of user cloud account information mapped to the content.

15. The device of claim 10, wherein the processor is configured to detect the attribute information regarding the content by using at least one of metadata of the content and log information about the device when the content is created or played.

16. The device of claim 10, further comprising:
a storage,
wherein the processor is configured to store metadata related to the content in the storage and delete the content from the storage after the transmitting of the content.

17. A non-transitory computer-readable recording medium having stored thereon a program which, when executed by a computer, causes the computer to perform a content transmission method by a device, the method comprising:
detecting, by a processor of the device, attribute information regarding content;
mapping, by the processor, at least one piece of user cloud account information with the content based on the detected attribute information regarding the content and attribute information regarding the at least one piece of user cloud account information;
displaying, on a display of the device, a result of the mapping the at least one piece of user cloud account information with the content, wherein the displaying of the result of the mapping comprises displaying a content list which comprises information for indicating attribute information regarding the at least one piece of user cloud account information that is mapped with the content;
in response to receiving, via a user interface of the device, a user input of selecting attribute information regarding the at least one piece of user cloud account information that is mapped with the content, changing the result of the mapping of the at least one piece of user cloud account information with the content according to the selected attribute information;
determining, by the processor, an external device based on the changed result of the mapping; and
transmitting, via a communicator of the device, the content to the determined external device,
wherein the external device includes a cloud service based server.

18. The non-transitory computer-readable recording medium of claim 17, wherein the attribute information regarding the content comprises at least one of:
synchronization history information about the content based on at least one piece of user cloud account information,
information about a type of the content,
time information about creation or playback of the content,
information about a location of the device during creation or playback of the content,
information about a network location during content creation or playback of the content,
user cloud account information activated during creation or playback of the content, and
information about an application by which the content is created or played; and
wherein the attribute information regarding the at least one piece of user cloud account information comprises at least one of information indicating a purpose of a user cloud account information, and a keyword input by a user of the device.

* * * * *